United States Patent
Yoon et al.

(10) Patent No.: US 8,903,390 B2
(45) Date of Patent: Dec. 2, 2014

(54) PROVISIONING SINGLE-MODE AND MULTIMODE SYSTEM SELECTION PARAMETERS AND SERVICE MANAGEMENT

(75) Inventors: Young Cheul Yoon, San Diego, CA (US); Carl Qu, San Diego, CA (US); Jun Wang, La Jolla, CA (US); Arvind Swaminathan, San Diego, CA (US); Shyamal Ramachandran, San Diego, CA (US); Srinivasan Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 590 days.

(21) Appl. No.: 12/778,934

(22) Filed: May 12, 2010

(65) Prior Publication Data

US 2011/0003590 A1 Jan. 6, 2011

Related U.S. Application Data

(60) Provisional application No. 61/253,436, filed on Oct. 20, 2009, provisional application No. 61/177,982, filed on May 13, 2009.

(51) Int. Cl.
*H04W 4/00* (2009.01)
*H04W 36/38* (2009.01)

(52) U.S. Cl.
CPC .................................. *H04W 36/385* (2013.01)
USPC ................... 455/435.2; 455/435.1; 455/435.3

(58) Field of Classification Search
USPC ........................................... 455/435.1, 435.2
See application file for complete search history.

(56) References Cited

U.S. PATENT DOCUMENTS

| | | | |
|---|---|---|---|
| 2004/0203893 A1* | 10/2004 | Kotzin | 455/456.1 |
| 2006/0282554 A1 | 12/2006 | Jiang et al. | |
| 2007/0263558 A1* | 11/2007 | Salomone | 370/318 |
| 2008/0081618 A1* | 4/2008 | Krantz et al. | 455/434 |

(Continued)

FOREIGN PATENT DOCUMENTS

| | | |
|---|---|---|
| CN | 1973561 A | 5/2007 |
| CN | 101204106 A | 6/2008 |

(Continued)

OTHER PUBLICATIONS

3GPP2: "Over-the-Air Service Provisioning of Mobile Stations in Spread Spectrum Standards, Release D (extracts)" 3GPP2 C.S0016-D, [Online] Jan. 25, 2010, XP002596061 Retrieved from the Internet: URL:www.3gpp2.org> [retrieved on Aug. 10, 2010].

(Continued)

*Primary Examiner* — Mazda Sabouri
(74) *Attorney, Agent, or Firm* — Kristine U. Ekwueme

(57) ABSTRACT

Multi-mode system selection (MMSS) enables a mobile station (MS) to prioritize MS preference for selecting particular radio air-interfaces (AI) across multiple standards (e.g., 3GPP, 3GPP2, WiMAX). 3GPP2 is developing a scheme MMSS-3GPP2 which is usually referred to as simply 'MMSS.' Other schemes exist e.g., proprietary ones (e.g., internal ePRL), an MMSS-3GPP based on the PLMN with Access Technologies of non-3GPP systems. MMSS OTASP messages and parameters are being defined in 3GPP2 to allow the carriers to provision MMSS parameters to the mobile device. With MMSS, the mobile can select and hence acquire cdma2000 and non-cdma2000 systems (e.g., LTE, WiMAX) based on carrier's preferences.

55 Claims, 14 Drawing Sheets

(56) References Cited

U.S. PATENT DOCUMENTS

| | | | |
|---|---|---|---|
| 2008/0146280 A1* | 6/2008 | Sasse et al. | 455/558 |
| 2008/0182615 A1 | 7/2008 | Xue et al. | |
| 2009/0247160 A1* | 10/2009 | Muller | 455/435.3 |
| 2010/0075665 A1* | 3/2010 | Nader et al. | 455/426.1 |
| 2010/0227641 A1* | 9/2010 | Muller | 455/552.1 |
| 2010/0267383 A1* | 10/2010 | Konstantinou et al. | 455/435.2 |

FOREIGN PATENT DOCUMENTS

| | | |
|---|---|---|
| JP | 2008500756 A | 1/2008 |
| JP | 2008271518 A | 11/2008 |
| TW | 200913646 A | 3/2009 |
| WO | WO02093955 | 11/2002 |
| WO | WO2005117463 A2 | 12/2005 |
| WO | 2006109159 A2 | 10/2006 |
| WO | 2007069753 A1 | 6/2007 |
| WO | 2008030956 A2 | 3/2008 |

OTHER PUBLICATIONS

International Search Report and Written Opinion—PCT/US2010/034799, International Search Authority—European Patent Office—Aug. 24, 2010.

Taiwan Search Report—TW099115317—TIPO—Sep. 11, 2013.

* cited by examiner

```
                    ┌─────────┐
                    │ FIG. 4C │
                    └────┬────┘
                         ▼
┌─────────────────────────────────────────────────────────────────┐
│  PACKET CALL SILENT REDIAL FOR MMM CAN FOLLOW THE PROCEDURES    │
│  SPECIFIED FOR LTE MULTIMODE DEVICES EXCEPT FOR LOOKING FOR 1X  │
│  SYSTEMS. THE UE DOES NOT TRANSITION ACROSS MMM AND 1X FOR      │
│              SILENT REDIAL FUNCTIONALITY 466                    │
└─────────────────────────────────────────────────────────────────┘
                         ▼
┌─────────────────────────────────────────────────────────────────┐
│  AFTER REDIRECTION FROM LTE TO (E)HRPD OR RESELECTION/BSR FROM  │
│   LTE TO (E)HRPD, THE ASSOCIATION TAG WILL BE IGNORED IF THE 1X │
│  SYSTEM ACQUIRED IN 1XM AND NEW DO ARE NOT ASSOCIATED. FOLLOW   │
│   CDG #143 PROCEDURES TO MOVE TO AN ASSOCIATED HRPD SYSTEM 468  │
└─────────────────────────────────────────────────────────────────┘
                         ▼
┌─────────────────────────────────────────────────────────────────┐
│    WHEN THE UE IS CAMPED ON A 1XRTT SYSTEM THAT HAS A HIGHER    │
│     PREFERENCE THAN THE ACQUIRED SYSTEM IN THE MMM, THE PACKET  │
│    SESSION CAN BE SUPPORTED OVER THE 1XM. MMM CONTINUES TO LOOK │
│     FOR LTE AND (E)HRPD SYSTEMS THAT EQUAL OR HIGHER PREFERENCE │
│        THAT THE CURRENTLY ACQUIRED 1XRTT SYSTEM IN THE 1XM 470  │
└─────────────────────────────────────────────────────────────────┘
```

*FIG. 4D*

| Identifier: '4Fxx' | Structure: transparent | Optional |
|---|---|---|
| SFI: '02' | | |
| File size: X bytes | Update activity: Low | |
| Access Conditions:<br>    READ                ALWAYS<br>    UPDATE           ADM<br>    INVALIDATE     ADM<br>    REHABILITATE  ADM | | |

| Bytes | Description | M/O | Length |
|---|---|---|---|
| 1-x | MMSS Selection | M | 1-x bytes |

FIG. 5

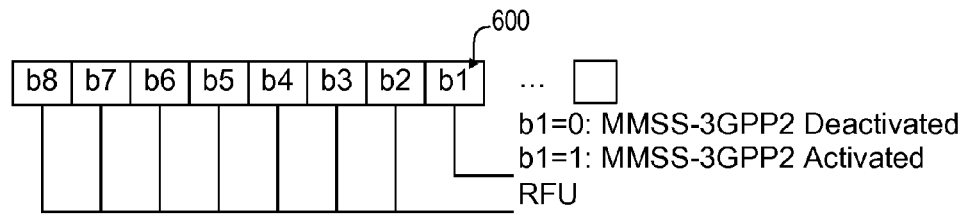

FIG. 6

| Identifier: '6F97' | Structure: Transparent | Optional |
|---|---|---|
| File size: 1 byte | Update Activity: Medium | |
| Access Conditions:<br>    READ                PIN<br>    UPDATE           ADM<br>    INVALIDATE     ADM<br>    REHABILITATE  ADM | | |

| Bytes | Description | M/O | Length |
|---|---|---|---|
| 1 | Mode Settings | M | 1 byte |

FIG. 7

|  |  |  |
|---|---|---|
| Identifier: '6F98' | Structure: Transparent | Optional |
| File size: X bytes | Update Activity: Medium | |
| Access Conditions:<br>    READ                    PIN<br>    UPDATE             ADM<br>    INVALIDATE        ADM<br>    REHABILITATE    ADM | | |

| Bytes | Description | M/O | Length |
|---|---|---|---|
| 1 – X | MLPL | M | X bytes |

*FIG. 8*

|  |  |  |
|---|---|---|
| Identifier: '6F99' | Structure: Transparent | Optional |
| File size: X bytes | Update Activity: Medium | |
| Access Conditions:<br>    READ                    PIN<br>    UPDATE             ADM<br>    INVALIDATE        ADM<br>    REHABILITATE    ADM | | |

| Bytes | Description | M/O | Length |
|---|---|---|---|
| 1 – X | MSPL | M | X bytes |

*FIG. 9*

|  |  |  |
|---|---|---|
| Identifier: '6F9A' | Structure: Transparent | Optional |
| File size: 1 byte | Update Activity: Medium | |
| Access Conditions:<br>    READ                    PIN<br>        UPDATE                                      ADM<br>    INVALIDATE        ADM<br>    REHABILITATE    ADM | | |

| Bytes | Description | M/O | Length |
|---|---|---|---|
| 1 – X | WLAN Configuration | M | X bytes |

*FIG. 10*

PROVISIONING SINGLE-MODE AND MULTIMODE SYSTEM SELECTION PARAMETERS AND SERVICE MANAGEMENT

CLAIM OF PRIORITY UNDER 35 U.S.C. §119

The present Application for Patent claims priority to Provisional Application No. 61/253,436 entitled "Method and Apparatus for Provisioning Multimode System Selection Parameters" filed Oct. 20, 2009, and to Provisional Application No. 61/177,982 entitled "Method and Apparatus for Provisioning Multimode System Selection Parameters" filed May 13, 2009, each assigned to the assignee hereof and hereby expressly incorporated by reference herein.

BACKGROUND

1. Field

The present disclosure relates to a mobile operating environment, and more particularly, to provisioning mobile equipment or smart card for selecting various access technologies.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and Radio Network Controllers (RNC). The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1X, CDMA2000 1x EV-DO Rev. 0, CDMA2000 EV-DO Rev. A, and CDMA2000 EV-DO Rev. B. All are approved radio interfaces for the ITU's IMT-2000. CDMA2000 has a relatively long technical history and is backward-compatible with its previous 2G iteration IS-95 (cdmaOne).

CDMA2000 1X (IS-2000), also known as 1x and 1xRTT, is the core CDMA2000 wireless air interface standard. The designation "1x", meaning 1 times Radio Transmission Technology, indicates the same RF bandwidth as IS-95: a duplex pair of 1.25 MHz radio channels. 1xRTT almost doubles the capacity of IS-95 by adding 64 more traffic channels to the forward link, orthogonal to (in quadrature with) the original set of 64. The 1x standard supports packet data speeds of up to 153 kbps with real world data transmission averaging 60-100 kbps in most commercial applications. IMT-2000 also made changes to the data link layer for the greater use of data services, including medium and link access control protocols and QoS. The IS-95 data link layer only provided "best effort delivery" for data and circuit switched channel for voice (i.e., a voice frame once every 20 ms).

CDMA2000 1xEV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by 3rd Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

In order for handsets to interface with subscriber networks, subscriber identification carried by the handset is required. For example, a Subscriber Identity Module (SIM) on a removable SIM card securely stores the service-subscriber key for identification purposes on mobile telephony devices (such as mobile phones and computers). The SIM card allows users to change phones by simply removing the SIM card from one mobile phone and inserting it into another mobile phone or broadband telephony device.

A SIM card contains its unique serial number, International Mobile Subscriber Identifier (IMSI) of the mobile device, security authentication and ciphering information, temporary information related to the local network, a list of the services the user has access to and two passwords (PIN for usual use and PUK for unlocking).

Each SIM card stores a unique International Mobile Subscriber Identity (IMSI), of this number format: (a) The first 3 digits represent the Mobile Country Code (MCC); (b) The next two or three digits represent the Mobile Network Code (MNC); (c) The remaining digits represent the Mobile Station Identification (MSID) number; and (d) A SIM card also has an Integrated Circuit Card Identification (ICC-ID) number.

A virtual SIM is a mobile phone number provided by a mobile network operator that does not require a SIM card to terminate phone calls on a user's mobile phone.

A RUIM card (also R-UIM) or Removable User Identification Module, is a removable smart card for cellular phones made for the CDMA2000 network. The R-UIM is essentially the 3GPP/ETSI SIM for CDMA2000 systems—which are both based on the Integrated Circuit Card (ICC). The RUIM card holds a user's personal information such as name and account number, cell phone number, phone book, text messages and other settings.

A CDMA2000 Subscriber Identify Module (CSIM) is an application that runs on the newer smart card known as the Universal Integrated Circuit Card (UICC). The UICC can store a CSIM application, USIM application, SIM and/or R-UIM and can be used to enable operation with cellular networks globally. UICC carries the Application Directory Files (ADF) of CSIM and USIM and others. SIM and R-UIM are legacy cards based on ICC. Both SIM and R-UIM can be added on to the UICC but not as an ADF but as a DF (Directory File). The UICC which can carry a CSIM application allows users to change phones by simply removing the smart card from one mobile phone and inserting it into another mobile phone or broadband telephony device.

Hereinafter, the term "smart card" will be used to encompass these technologies and their equivalents.

Dual mode (or multimode) mobiles refer to mobile phones that are compatible with more than one form of data transmission or network, as contrasted with single-mode mobiles. For instance, a dual-mode phone can be a telephone which uses more than one technique for sending and receiving voice and data. This could be for wireless mobile phones or for wired phones.

In one aspect, the dual mode can refer to network compatibility, such as mobile phones containing two types of cellular radios for voice and data. These phones include combination of GSM and CDMA technology. They can be used as a GSM or CDMA phone according to user preference. These handsets are also called global phones and are essentially two phones in one device. For this particular example of a dual mode cdma2000 and GSM phone, there are two possibilities, either two cards (R-UIM and SIM) or one card (SIM-only) where the R-UIM information is stored in the Mobile Equipment (handset shell).

In another aspect, a dual mode mobile can use both cellular and non-cellular radios for voice and data communication. There are also two types of dual mode phones which use cellular radio that contain GSM/CDMA/W-CDMA as well as other technology like IEEE 802.11 (Wi-Fi) radio, WiMAX, or DECT (Digital Enhanced Cordless Telecommunications) radio. These phones can be used as cellular phones when connected to a wide area cellular network. When within range of a suitable Wi-Fi or DECT network, the phone can be used as a Wi-Fi/DECT phone for all communications purposes. This method of operation can reduce cost (for both the network operator and the subscriber), improve indoor coverage and increase data access speeds.

Wi-Fi is a subset of wireless local area network (WLAN) that links devices via a wireless distribution method (typically spread-spectrum or OFDM) and usually provides a connection through an access point to the wider Internet. This gives users the mobility to move around within a local coverage area and still be connected to the network.

WiMAX, an acronym for Worldwide Interoperability for Microwave Access, is a telecommunications technology that provides fixed and fully mobile internet access. WiMAX is based on the IEEE 802.16 standard (also called Broadband Wireless Access). The name "WiMAX" was created by the WiMAX Forum, which was formed in June 2001 to promote conformity and interoperability of the standard. The forum describes WiMAX as "a standards-based technology enabling the delivery of last mile wireless broadband access as an alternative to cable and DSL".

With these various access technologies and various connectivity limitations of a handset and its subscriber identification, a challenge exists with provisioning devices for system selection parameters and service management.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In one aspect, a method is provided for provisioning mobile equipment or smart card for system selection of air-interface/access technologies. A multimode system selection scheme is accessed for selecting a radio access technology from a plurality of radio access technologies. A capability constraint of a mobile device is determined for using the plurality of radio access technologies. The mobile device communicates with a radio access network using a selected radio access technology according to the multimode system selection scheme and the capability constraint.

In another aspect, at least one processor is provided for provisioning mobile equipment or smart card for system selection of air-interface/access technologies. A first module accessing a multimode system selection scheme for selecting a radio access technology from a plurality of radio access technologies. A second module determines a capability constraint of a mobile device for using the plurality of radio access technologies. A third module communicates with a radio access network using a selected radio access technology according to the multimode system selection scheme and the capability constraint.

In an additional aspect, a computer program product is provided for provisioning mobile equipment or smart card for system selection of air-interface/access technologies. A non-transitory computer-readable storage medium comprises sets of codes. A first set of codes causes a computer to access a multimode system selection scheme for selecting a radio access technology from a plurality of radio access technologies. A second set of codes causes the computer to determine a capability constraint of a mobile device for using the plurality of radio access technologies. A third set of codes causes the computer to communicate with a radio access network using a selected radio access technology according to the multimode system selection scheme and the capability constraint.

In another additional aspect, an apparatus is provided for provisioning mobile equipment or smart card for system selection of air-interface/access technologies. Means are provided for accessing a multimode system selection scheme for selecting a radio access technology from a plurality of radio access technologies. Means are provided for determining a capability constraint of a mobile device for using the plurality of radio access technologies. Means are provided for communicating with a radio access network using a selected radio access technology according to the multimode system selection scheme and the capability constraint.

In a further aspect, an apparatus is provided for provisioning mobile equipment or smart card for system selection of air-interface/access technologies. A computing platform accesses a multimode system selection scheme for selecting a radio access technology from a plurality of radio access technologies. A smart card interfaced to the computing platform for determines a capability constraint of a mobile device for using the plurality of radio access technologies. A transceiver communicates with a radio access network using a selected radio access technology according to the multimode system selection scheme and the capability constraint.

In yet one more aspect, a method is provided for provisioning mobile equipment or smart card for system selection of air-interface/access technologies. A host radio access network serves mobile device using a host radio access technology. The host radio access network transmits a command to the mobile device for modifying a data structure stored on a smart card containing a multimode system selection scheme for selecting a radio access technology from a plurality of radio access technologies, wherein the mobile device determines a capability constraint based at least in part upon the command for using the plurality of radio access technologies.

In yet another aspect, at least one processor is provided for provisioning mobile equipment or smart card for system selection of air-interface/access technologies. A first module serves a mobile device from a host radio access network using a host radio access technology. A second module transmits a command to the mobile device for modifying a data structure containing a multimode system selection scheme for selecting a radio access technology from a plurality of radio access technologies, wherein the mobile device determines a capability constraint based at least in part upon the command for using the plurality of radio access technologies.

In yet an additional aspect, a computer program product is provided for provisioning mobile equipment or smart card for system selection of air-interface/access technologies. A non-transitory computer-readable storage medium comprises sets of code. A first set of codes causes a computer to serve a mobile device from a host radio access network using a host radio access technology. A second set of codes causes the computer to transmit a command to the mobile device for modifying a data structure containing a multimode system selection scheme for selecting a radio access technology from a plurality of radio access technologies, wherein the mobile device determines a capability constraint based at least in part upon the command for using the plurality of radio access technologies.

In yet another additional, an apparatus is provided for provisioning mobile equipment or smart card for system selection of air-interface/access technologies. Means are provided for serving a mobile device from a host radio access network using a host radio access technology. Means are provided for transmitting a command to the mobile device for modifying a data structure containing a multimode system selection scheme for selecting a radio access technology from a plurality of radio access technologies, wherein the mobile device determines a capability constraint based at least in part upon the command for using the plurality of radio access technologies.

In yet a further aspect, an apparatus is provided for provisioning mobile equipment or smart card for system selection of air-interface/access technologies. A scheduler serves a mobile device from a host radio access network using a host radio access technology. A transceiver transmits a command to the mobile device for modifying a data structure containing a multimode system selection scheme for selecting a radio access technology from a plurality of radio access technologies, wherein the mobile device determines a capability constraint based at least in part upon the command for using the plurality of radio access technologies.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 4A-4D illustrates flow diagrams for a methodology or sequence of operation for multiple radio, multimode system selection operation.

FIG. 5 illustrates a diagram of a data structure for an Elementary Field (EF) in a smart card for multimode system selection.

FIG. 6 illustrates a diagram of a data structure for coding the EF of FIG. 5.

FIG. 7 illustrates a diagram of a data structure for an EF for mode settings for multimode system selection.

FIG. 8 illustrates a diagram of a data structure for an EF for location associated priority lists for multimode system selection.

FIG. 9 illustrates a diagram of a data structure for an EF for system priority lists for multimode system selection.

FIG. 10 illustrates a diagram of a data structure for an EF for wireless local access network configuration for multimode system selection.

DETAILED DESCRIPTION

Figure 1:
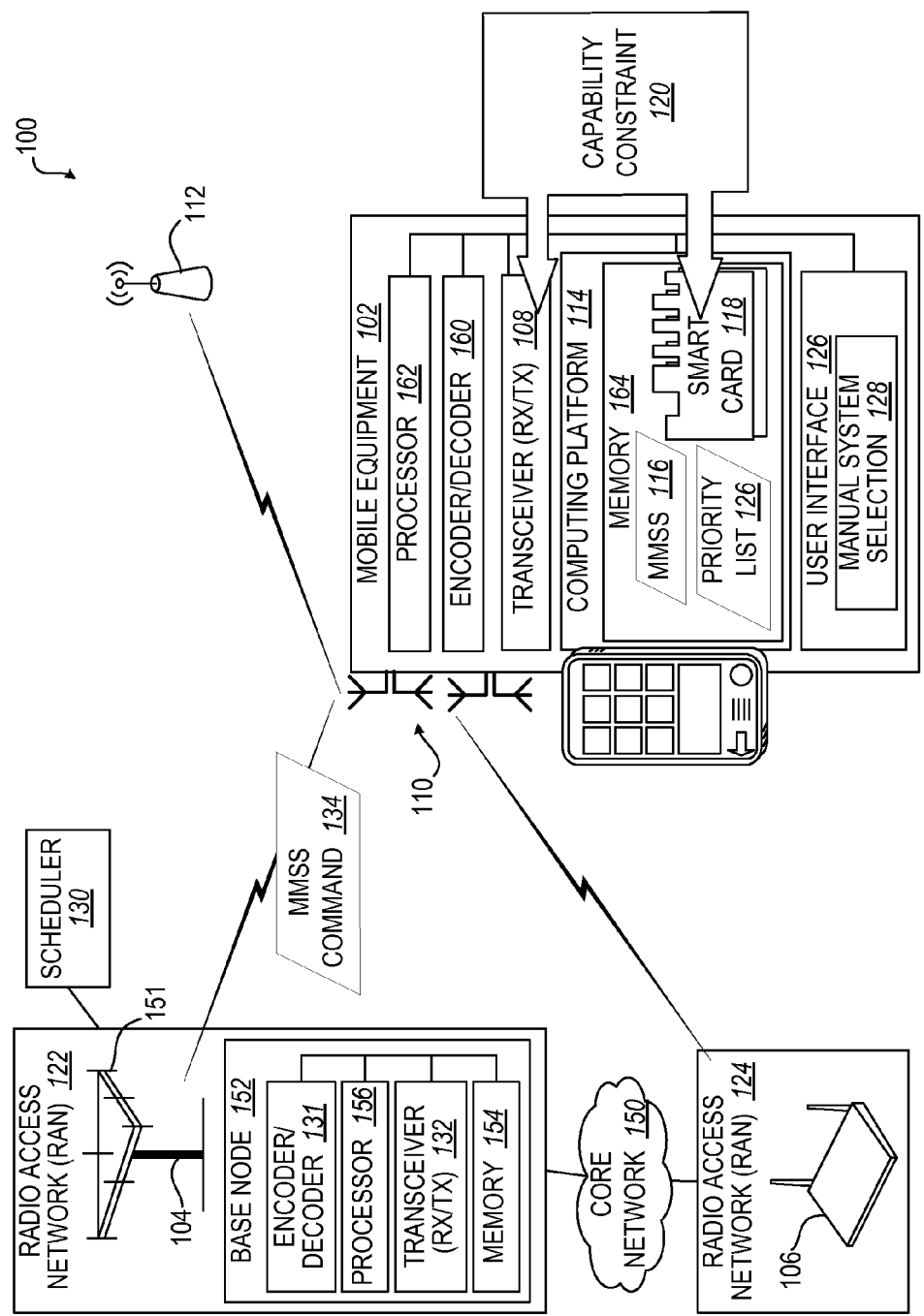
FIG. 1 illustrates a schematic depiction of a communication system provisioned for system selection among multiple access technologies.

It should be appreciated with the benefit of the present disclosure that multimode system selection (MMSS) addresses use of multiple radios in mobile devices (handset). Conventional MMSS has been developed under the general assumption of a single transceiver in the handset. However, actual handset development has been directed to supporting (a) two Receivers (RXs) and one active Transmitter (TX) (2 RX/1 TX); and (b) two simultaneously active transceivers (2 RX/2 TX). For example, consider LTE/CDMA2000 handsets that support Simultaneous Voice over cdma2000 1x and data over LTE (SVLTE). As another example, consider dual RX (i.e., used for multiple technologies) with one TX that supports Circuit Switch Fallback (CSFB). Consequently, the present innovation supports such new handsets by generalizing MMSS to support multiple RX and/or multiple TXs configurations.

Currently, the 3GPP2 Preferred Roaming List (PRL) supports 'Associated Systems'. For instance, cdma2000 systems such as 1x and HRPD can be grouped into sets. The PRL can also indicate if they share common Pseudo-Noise (PN) Offsets using PN_ASSOCIATION or common set of Packet Data Serving Nodes (PDSNs) using DATA_ASSOCIATION. This helps manage data connections by being able to prevent a data connection to a different operator's DO and ensure data connection to, at least, the home (desired) operator's 1x system, if not the home DO.

The 3GPP2 MMSS Location Associated Priority List (MLPL) and MMSS System Priority List (MSPL) support conventional MMSS that allows system selection across 3GPP versus 3GPP2 systems and is designed for single RX/TX systems.

The CDMA Development Group (CDG) further refines this with a '1x-DO Hybrid Mode' wherein 1x serves as an anchor system for DO system selection and only DO systems 'associated' with a 1x system can be selected. When a new 1x system is acquired, a new set of associated DO systems can only be selected. Acquisition attempts of DO are limited to systems that are associated with the acquired 1x system as their approach to speed up the search for DO service, as well as saves on power consumption. CDG provides additional requirements on MMSS, which again are for single RX/TX multimode handsets.

It should be noted that there are certain implementations where, despite having two RX chains, the mobile station (MS) attempts to use one RX chain and may behave as if it had only a single RX chain. For Simultaneous Voice-Data Operation (SVDO) where the second RX chain may introduce greater power (i.e., dB) losses, the first RX chain may be largely used. By contrast, for SHDR with two RX chains where second RX chain may be of closer quality, the second RX chain may be used much more. Thereby, shortcomings can be experienced in that system selection for multiple radio systems is currently limited to cdma2000 systems which require 1x to be the anchor system. Conventional MMSS is limited to single RX/single TX usage. For example, given a 1x LTE dual-mode handset with one Rx chain for 1x and another for LTE, system selection for the two radios may operate independently or in a coordinated fashion, e.g., based on Association similar to that cdma2000 systems.

As an introduction, consider radio configuration examples wherein baseband processor options include combinations of 1x, evolved High Rate Packet Data (eHRPD) and LTE: (a) 1x and eHRPD/LTE (two processors); (b) 1x/eHRPD and LTE (two processors); and (c) 1x/eHRPD/LTE (single). The number of RX chains can include (a) one RX chain that is shared among the multiple processors; (b) two one processor for each RX chain; or (c) one RX chain shared for idle state usage with a second RX chain used when the first RX chain is in an active state.

Thus, the present innovation is provide a means for an MS to perform system selection of two or more systems that goes beyond conventional MMSS with its current 1x-DO limitation. In an exemplary aspect, the innovative evolved MMSS ("eMMSS") addresses 3GPP/3GPP2 systems.

Consider initial conditions to be addressed to include different transceiver types: (a) Single RX/Single TX (with off-frequency scans), (b) Dual RX/Single TX; (c) Dual RX/Dual TX (e.g., SVLTE, SVDO); and (d) a general case with multiple RXs and/or multiple TXs.

The initial conditions to be addressed can also include different Air-Interface (AI) types: (a) Wireless Wide Area Network (WWAN) (e.g., Intra-standard Air-Interfaces such as 1x+DO, Inter-standard (MMSS) such as LTE/cdma2000); (b) non-WWAN air-interfaces (e.g., Wireless Local Access Network (WLAN), Personal Access Network (PAN)). For clarity, the present disclosure focuses on the WWAN AI type, although it should be appreciated that aspects can apply to non-WWAN types.

In one aspect, eMMSS can address these needs without requiring a change to applicable standards.

1(a). First, a mobile device can be provided with one radio with 3GPP/3GPP2 and second radio with 3GPP2 (e.g., eHRPD/LTE and 1x, respectively). The eHRPD/LTE side could use MMSS and underlying PRL and PLMN lists. The 1x side could use a second PRL with the Association. In a particular implementation, the associated HRPD systems could also be provisioned to help the mobile device or terminal to find the associated eHRPD system. In order to ensure that the two PRLs and PLMN list are provisioned properly, the 1x AI can be removed from the first PRL ("PRL1") and HRPD can be removed from the second PRL ("PRL2"). The PLMN list could be provisioned only with LTE. Alternatively, a single PRL can be filtered for PRL1 and PRL2. In addition, an Over-The-Air Service Provisioning (OTASP) and smart card specifications can require changes to send and store two PRLs, respectively. Alternatively, one single PRL can be sent to the mobile and the mobile splits it to two PRLs which are stored in two places on the mobile or on the smart card (or two smart cards). One of ordinary skill in the art should recognize an exemplary disclosure for OTASP in 3GPP2, "Over-the-Air Service Provisioning of Mobile Stations in Spread Spectrum Standards", C.S0016-D v1.0, January 2010.

1(b). Second, a mobile device or terminal can be provided with one radio having 3GPP/3GPP2 and second radio with 3GPP (e.g., eHRPD/LTE and GSM/UMTS). The eHRPD/LTE side could use MMSS and underlying PRL and PLMN lists. GSM side could use a second Private Land Mobile Network (PLMN) list. In order to ensure that the PRL and two PLMN lists are provisioned properly, the 1x AI can be removed the PRL, PLMN list 1 could be provisioned only with LTE, and PLMN list 2 could be provisioned only with GSM/UMTS. In one aspect, the same PLMN could be used to create PLMN List 1, List 2.

1(c). Third, a mobile device or terminal can be provided with one radio having 3GPP2 and second radio with 3GPP (e.g., 1x/eHRPD and LTE). The 1x/eHRPD side could use PRL and LTE side could use the PLMN.

1(d). Fourth, a mobile device or terminal can be provided with one radio having 3GPP/3GPP2 and second radio with 3GPP/3GPP2 (e.g., 1x/GSM and eHRPD/LTE). The 1x/GSM side could use MMSS1 and PRL1, PLMN1. The eHRPD/LTE side would use MMSS2 with PRL2 and PLMN2. Options can be implemented to re-use of the same PRL, PLMN and/or MMSS. Certain implementations can result in OTASP and smart card specification changes to support multiple MMSS downloads (e.g., MMSS 1, MMSS 2).

In another aspect, MMSS according to the present innovation can address these needs without a requirement to change applicable standards. This MMSS approach can use an implicit association of systems, such as in PRL, to MMSS. As a first option, the implicit association can be used only with unique MSPL and MLPL record pairs. As a second option, given a 1x/eHRPD associated pair (in PRL), any system more preferred or equal to that eHRPD system is considered associated with this 1x/eHRPD pair. For example, cdma2000 systems can be associated with a PLMN_ID rather than a specific Radio Access Technology (RAT).

2. In another aspect, a PRL approach according to the present innovation can address these needs with a requirement to change applicable standards. In particular, this can be accomplished by adding LTE and 3GPP system types to the conventionally-defined PRL or by extending the currently-defined 1x-DO/LTE Hybrid mode where 1x remains as the anchor 3. A 3GPP approach can be used as another aspect that requires a change to applicable standards. A new Elementary File (EF) (e.g., EF (Associated_Systems)) can be created to link Mobile Country Code (MCC), Mobile Network Code (MNC), and RAT types. Alternatively, an existing EF can be modified by adding this Associated_Systems field to group systems. For example, MCC/MNC/RAT/ASSOCIATION (16 bit) could use the C.S0016-D new MCC-based Sys_Record to map System Identifier (SID)/Network Identifier (NID) to MCC/MNC.

4. In another aspect, an MMSS approach can be implemented by changing applicable standards to add an Association feature (in PRL) to MMSS. To ensure proper provisioning, note that MSPL does not explicitly list the SID/NID, Subnet IDs nor MCC/MNCs. Provisioning can require that the MLPL points to the MSPL. However, multiple MLPLs can point to the same MSPL. The MSPL can be modified to follow the PRL Association approach in order to address cross-standard Air-Interfaces (AI) (e.g., LTE-1x). It should be appreciated that this approach has application to same standard AIs (e.g., 1x/DO or LTE/GSM).

New fields can be added to MMSS:
ASSOCIATION_INCL (1 bit);
ASSOCIATION_TAG (8 bits) having a value that is unique within an MSPL record;
NETWORK_ASSOCIATION (1 bit) that is set only if the AIs share the same PDSN;
ANCHOR_SYSTEM (0 or 1 bit) that indicates if the system is the anchor system, which becomes the primary system for system selection purposes (similar to 1x in Hybrid 1x DO). If ASSOCIATION_INCL=1 and no system is indicated as an Anchor, then there is no Anchor system. In some applications, multiple anchors can be allowed.
CELL_IDENTITY_ASSOCIATION (0 or 1) indicates there is an association of the PN_OFFSET for cdma2000 systems and the CELL_IDENTITY for LTE. Alternatively, association of systems without any new fields can provided. Systems identified by an MLPL/MSPL pair (where the MLPL points to the MSPL) could be deemed as 'Associated Systems'. The two radios (e.g., 1x+eHRPD/LTE) as described above could use the same MMSS filtered appropriately and operate independent of each other. If finer granularity of association were needed, a coarse MLPL/MSPL pair could be separated into two or more finer-granularity MLPL/MSPL pairs.

With regard to cdma2000 and LTE cell-association, the PRL can indicate if the associated 1x and DO systems share common PN Offsets in order to limit acquisition to DO systems co-located with the anchor 1x system and to save battery power. A similar physical (PHY) layer mechanism to associate LTE and cdma2000 (or 3GPP systems in general) could provide the same benefits especially during initial roll-out.

Thereby, the handset need not need to exhaustively scan for the 3*168=504 unique LTE cell identities such as by referencing a mapping table. A similar field in MSPL can be added to tie the LTE cell identity to the cdma2000 PN_OFFSET (e.g., PN_CELL_IDENTITY_ASSOCIATION).

This mapping can be provided in several exemplary ways. In one aspect, one or more unique mappings of the 504 LTE cell identities to the cdma2000 PN offsets (e.g., 512) can be created that an operator could use. In another aspect, a 1x/DO broadcast message can be standardized to broadcast the cell-identity of a co-located LTE sector. A mapping table can be created for storage in the mobile device or terminal. For instance, the mappings between all RATs for an operator can be stored in a new table.

With regard to extension to beyond LTE and cdma2000, aspects can be tied to the 512 scrambling codes in Wideband Code Division Multiple Access (WCDMA) as well. As previously mentioned an implicit association can be employed. LTE systems can be implicitly always equal to or greater than eHRPD systems and assumed to be associated. In one variation, different radio configurations can be provided such as 1x/eHRPD/LTE all-in-one chip but still with two RX (1 or 2 TX) chains or such as by adding GSM/UMTS. In another variation, could have WiMAX as well as, or instead of, 3GPP or 3GPP2 (e.g., 1x and eHRPD/LTE/WiMAX, 1x and eHRPD/LTE and WiMAX, etc.). In an additional variation, could expand to three or more chips/receive chains (e.g., 1x/eHRPD and LTE and WiMAX and satellite link). In a further variation, PRL1 and PRL2 could use the same underlying PRL but unused systems can be filtered out. PLMN1 and PLMN2 and MMSS1 and MMSS2 can be handled similarly. In yet another aspect, band-class and channel number information can have this information. It should be appreciated that acquisition time would be saved.

For those aspects with two or more independently running system selection schemes, enhanced operation can be realized by allowing information to be shared between them. For example, given MMSS (for eHRPD/LTE) and PRL (for 1x), if RX1 running MMSS reads an Over-the-Air (OTA) MCC/MNC, RX1 can pass that information to RX2 running the PRL to speed up scans for the other receiver chain.

In another aspect, un-needed radios can be turned off. For example, if in a country that has no LTE, the second RX chain could be turned off and the LTE radio (or part of the radio) can be turned off Device can be put into a certain mode to avoid looking for specific radios either automatically or manually.

In a further aspect, could have multiple Universal Integrated Circuit Card (UICC) or Integrated Circuit Cards (ICCs) in the handset, such as each with their own separate MMSS, PRL, and PLMN lists. In yet an additional aspect, the device could also turn off one of the cards to save battery and/or if in a country which does not require the second radio or smart card.

In one aspect, a User Interface (UI) display is provided to indicate that the terminal state. For example the UI display can indicate whether single-radio or dual-radio, which radios are in use, whether in a limited service or out-of-service area, manual system selection mode or automatic mode or power-up mode, or which smart card or integrated circuit card (ICC) is active. In addition, when the smart card that was turned off earlier is turned back on, PIN verification can be done without user interaction by the device based on cached PIN information. This obviates a need for the user to enter the PIN each time the smart card is turned back on. These indications can be intuitive icons or annunciators.

Various aspects of the disclosure are further described below. It should be apparent that the teaching herein can be embodied in a wide variety of forms and that any specific structure or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented or a method practiced using any number of the aspects set forth herein. In addition, an apparatus can be implemented or a method practiced using other structure or functionality in addition to or other than one or more of the aspects set forth herein. As an example, many of the methods, devices, systems, and apparatuses described herein are described in the context of providing dynamic queries and recommendations in a mobile communication environment. One skilled in the art should appreciate that similar techniques could apply to other communication and non-communication environments as well.

As used in this disclosure, the term "content" and "objects" are used to describe any type of application, multimedia file, image file, executable, program, web page, script, document, presentation, message, data, meta-data, or any other type of media or information that may be rendered, processed, or executed on a device.

As used in this disclosure, the terms "component," "system," "module," and the like are intended to refer to a computer-related entity, either hardware, software, software in execution, firmware, middle ware, microcode, or any combination thereof. For example, a component can be, but is not limited to being, a process running on a processor, a processor, an object, an executable, a thread of execution, a program, or a computer. One or more components can reside within a process or thread of execution and a component can be localized on one computer or distributed between two or more computers. Further, these components can execute from various computer readable media having various data structures stored thereon. The components can communicate by way of local or remote processes such as in accordance with a signal having one or more data packets (e.g., data from one component interacting with another component in a local system, distributed system, or across a network such as the Internet with other systems by way of the signal). Additionally, components of systems described herein can be rearranged or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the operations or actions described herein.

Moreover, various aspects or features described herein can be implemented as a method, apparatus, or article of manufacture using standard programming or engineering techniques. Further, the operations or actions of a method or algorithm described in connection with the aspects disclosed herein can be embodied directly in hardware, in a software module executed by a processor, or in a combination of the two. Additionally, in some aspects, the operations or actions of a method or algorithm can reside as at least one or any combination or set of codes or instructions on a machine-readable medium or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices or other machine-readable media for storing information. The term "machine-readable medium" can include, without being limited to, wireless channels and various other media capable of storing, containing, or carrying instruction, or data.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or deducing states of a system, environment, or user from a set of observations as captured via events or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events or data. Such inference results in the construction of new events or actions from a set of observed events or stored event data, whether or not the events are correlated in close temporal proximity, and whether the events and data come from one or several event and data sources.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

In FIG. 1, in a multiple standard communication system ("wireless system") 100, an apparatus depicted as mobile equipment (e.g., terminal, handset, user equipment, etc.) 102 for being provisioned for system selection among multiple access technologies, depicted as a first and second Radio Access Technology (RAT) 104, 106. The mobile device or user equipment (UE) 102 can be at home or roaming.

Wireless UE 102 may be known by many different names, for example, cellular telephones, mobile stations, wireless handsets, etc. The scope of the innovation covers these and other such systems, names, terms and implementations for the elements of like types of wireless systems. UE 102 may comprise many different types of wireless devices, including one or more cellular telephone, wirelessly connected computer, PDA (personal digital assistant), pager, navigation device, music or video content download unit, wireless gaming device, inventory control unit, or other like types of devices communicating wirelessly via the air interface. Cellular or other wireless telecommunication services may communicate with a carrier network through a data link or other network link via the fixed network 150 which may be the Public Switched Telephone Network (PSTN), the Internet, Integrated Services Digital Network (ISDN), one or more local area networks (LAN) or wide area networks (WAN) or virtual private network (VPN), or other such network.

Selection of a particular MMSS scheme can be among multiple options such as 3GPP, 3GPP2, generalized PRL, etc. The mobile equipment 102 can have multiple radio configurations, depicted as having a transceiver 108 that can communicate simultaneously or sequentially via multiple transmitter and receiver antennas 110 to the RATs 104, 106 and to a wireless access point 112. A computing platform 114 accesses a multimode system selection (MMSS) scheme 116 for selecting a RAT 104, 106 from the plurality of RATs 104, 106. The computing platform 114 is interfaced to a smart card 118 for determining a capability constraint 120 of the mobile device 102 for using the plurality of RATs 104, 106. Various types of smart cards 118 can be employed, such as R-UIM, UICC with CSIM only, UICC with USIM and CSIM, SIM, etc.

The transceiver 108 communicates with a particular radio access network (RAN) 122, 124 using a selected RAT 104, 106 according to the MMSS scheme 116 and the capability constraint 120, which can be a radio capability of the mobile device 102. For instance, an available radio mode can include some combination of cdma2000, 3GPP and WiMAX (e.g., LTE/cdma2000 versus cdma2000-only, versus GSM-only).

A user interface 126 can present a user control 128 for manual system selection.

Alternatively or in addition, a scheduler 130 of the RAN 122 can serve the mobile device 102 as a host RAN using a host RAT 104. A transceiver 132 transmits an MMSS command 134 to the mobile device 102 for modifying a data structure containing the MMSS scheme 116 for selecting the RAT 104, 106 from the plurality of RATs 104, 106, wherein the mobile device 102 determines the capability constraint 120 based at least in part upon the command 134 for using the plurality of the RATs 104, 106.

In addition to providing a means to select one among multiple MMSS schemes, the communication system 100 can provide a means to select (e.g., enable and disable) each of the various air-interface technologies/access technologies. The command 134 can enable the user control 128 for manual system selection as a function of geographic location or operator. For instance, after a certain date, a particular RAT/AI may not be supported. Alternatively, in a certain geographic area, a particular RAT/AI may not be supported. Disabling this from the MMSS can avoid unnecessary scans or delays in acquiring service.

The MMSS 116 can employ defined MMSS EFs (Elementary Files) on the smart card 118. The smart card 118 can support defined MMSS commands 116.

The MMSS commands 116 can be defined in binary form or in records-based form.

A Service Number can be defined for MMSS.

OTASP commands can be used to insert, update and delete individual records in MMSS and define smart card EFs and commands in terms of these records.

LTE and IOTA-DM definitions can be used to enhance MMSS.

A scheme can manage the services on the Smart Cards over CDMA OTASP system and define a scheme to manage the common services including a MMSS service on the Smart Cards using a Generic Service Table. The MMSS scheme can specify how to handle a scenario when a legacy R-UIM is inserted into a LTE/cdma2000 phone.

The mobile device 102 and the smart card 118 can handshake and each indicates which MMSS schemes each supports. If there are multiple matches, then the network 122 can pre-provision a priority list 126 of the MMSS schemes 116 for the mobile device 102 to use. If there is only a single match, then the mobile device 102 picks the match. For example, if 3GPP2 MMSS and basic toggle between 3GPP/3GPP2 match and the former is more preferred, then the mobile device 102 can pick MMSS. If 3GPP PLMN is the only match, then the mobile device 102 can pick 3GPP PLMN and may not even function as a cdma2000 handset. If R-UIM card is inserted into a multimode terminal, then terminal operates only in cdma2000 mode, in cdma2000+1xEV-DO modes, in cdma2000+1xEV-DO+GSM modes. If an operator and R-UIM supports generalized PRL with PLMN entries and DF (GSM) for SIM and with the International Mobile Subscriber Information (IMSI) being provisioned, then MMSS could function.

If CSIM is absent, then 3GPP PLMN could be used. If the 3GPP PLMN list contains the cdma2000 RATs and a table mapping from MCC/MNC to SID/NID, then MMSS can be used. DF (CDMA) for R-UIM can be used for identity and credentials information. Otherwise, 3GPP system can be the selection.

If CSIM is present but DF (MMSS) may not be present, then a similar implementation as above can be used.

An EF (or OTASP message) can be defined and provisioned with a priority listing of the MMSS schemes. The mobile device 102 can store its air-interface (AI) capabilities to the smart card 118.

With regard to system selection download and also smart card storage, in general custom downloads can be allowed for users tailored to target locations. For example, two PRLs could be selectively provisioned for Home PRL and Roaming PRL. A geographic-based provisioning for the mobile device 102 can be used. In some implementations, either over-the-air resources or on-board resources can be saved by provisioning or downloading only a needed portion or a selected one of a plurality of PRLs, for instance limited to those applicable to a particular country.

In order to avoid consuming available battery power, the MMSS scheme can incorporate features to reduce scans or discontinue scans when the mobile device 102 is in an Out-of-Service (OoS) state. For example, as deployed, the mobile device 102 may default to searching for HRPD service even though such service is no longer available, even if not listed in the PRL. As a particular scenario, consider that the mobile device 102 is roaming in a country with only 1x service. When coverage is lost, the mobile device may scan for HRPD during OOS. This can apply to all system selection schemes (e.g., 3GPP, WiMAX). To mitigate or avoid this situation, a field is added to the PRL (or PLMN) that can explicitly indicate that scanning for this particular AI (e.g., in OOS condition) is not allowed (nor necessary). The option would still exist to not provision this field so that the mobile device 102 can scan for an AI that is not listed. This implementation can apply to MMSS especially when the basic MSPL (MMSS System Priority List) system entry: cdma2000_AI and 3GPP_AI are used.

It should be appreciated with the benefit of this disclosure that enabling/disabling of RAT/AI can be defined and executed as a function of frequency, channel, or band class and can be by geographic 2D or 3D coordinate. Moreover, channel and interference conditions as recognized by a cognitive radio can be detected to make adaptive changes in scans for service.

With further reference to FIG. 1, a wireless computer system 100 can incorporate aspects that support mobile stations and client devices in accordance with various disclosures of the present innovation. A wireless system 100 typically includes a core network 150, one or more radio network subsystems, and wireless user equipment 102. The RNS, in turn, includes one or more each of a radio network controller, depicted as the scheduler 130 connected to base nodes 152. Depending upon the particulars of the implementation the base node 152 may take other forms. The wireless network depicted in the figure is merely exemplary and may include any system that allows communication over-the-air between and among components.

Communications to and from various scheduler 130 and base node 152 elements are typically carried out via this network of landlines which may include portions of the Internet and/or the Public Switched Telephone Network (PSTN). Upstream, the scheduler 130 may be connected to multiple networks, such as those mentioned above, e.g., PSTN, Internet, ISDN, etc., thus allowing client UE 102 devices access to a broader communication network. In addition to voice transmission data may be transmitted to the client device via Short Message Service (SMS) or other Over-the Air (OTA) methods known in the art.

Base node 152 broadcasts data messages or other information wirelessly to UE 102 by over-the-air (OTA) methods known to those of ordinary skill in the art. For example, the wireless signals between UE 102 and base node 152 may be based on any of several different technologies, including but not limited to, CDMA (code division multiple access), TDMA (time division multiple access), FDMA (frequency division multiplexed access), OFDM (orthogonal frequency division multiplexing) and any systems using a hybrid of coding technologies such as GSM, LTE, or other like wireless protocols used in communications or data networks.

Base node 152 includes an encoder/decoder 131 which encodes information to be transmitted and decodes received information in the appropriate coding protocol or scheme. Base node can include receiver/transmitter circuitry 132 for wirelessly receiving packets via antennas 151 from the UE 102, and for transmitting packets to the scheduler 130 (which may be transmitted via a landline). Base node 152 also includes a processor 158 which contains circuitry or other logic capable of performing or controlling the processes and activities involved in wireless communications, and in particular, the processes or activities set forth herein.

The base node 152 may also be configured to include a memory 154 for storing the various protocols, routines, processes or software to be used in conducting wireless communications as set forth herein. For example, the memory 154 may store one or more transmission schemes, protocols or strategies for communicating with a UE 102. The transmission schemes, strategies and protocols include information concerning the timing for retransmissions due to lost or corrupted data, the redundancy version encoding (if any), and any encoding schemes or protocols to be used for the transmission and reception of wireless communications. This information may also be stored in the memory of the scheduler 130, and communicated to the base node 152 as needed or while performing periodic updates and system maintenance.

The UE 102 typically includes a processor or other logic 162, memory 164 and encoder/decoder circuitry 160 which perform functions similar to those of the corresponding parts of base node 152. For example, the encoder circuitry 160, or other like circuitry with the UE 102, is configured to encode or otherwise encapsulate data into a packet for transmission to the base node 152. Each UE 102 also has receiver/transmitter circuitry 108 and other electronics known to those of ordinary skill in the art for wirelessly receiving and transmitting information.

The UE 102 includes logic labeled as processor 162. In practice the logic may be configured in the form of one or more processing circuits executing resident configured logic, a microprocessor, a digital signal processor (DSP), a microcontroller, or a combination of these or other like hardware, software and/or firmware configured to at least perform the operations described herein. The UE 102 may contain a Subscriber Identity Module (SIM) or other such circuitry that identifies the UE 102, enabling it to make and receive calls at that terminal and receive other subscribed services. An International Mobile Equipment Identity (IMEI) of the UE 102 stored on the SIM card uniquely identifies that particular UE 102. The SIM card may also have an International Mobile Subscriber Identity (IMSI) used to identify the subscriber to the system, along with a copy of a secret key from an Authentication Center (AuC) register for authentication, and other information pertaining to security, identification and communication protocols. A UE 102 often has installed on it, or otherwise downloads, one or more software applications, such as games, news, stock monitors, and the like.

Figure 2A:
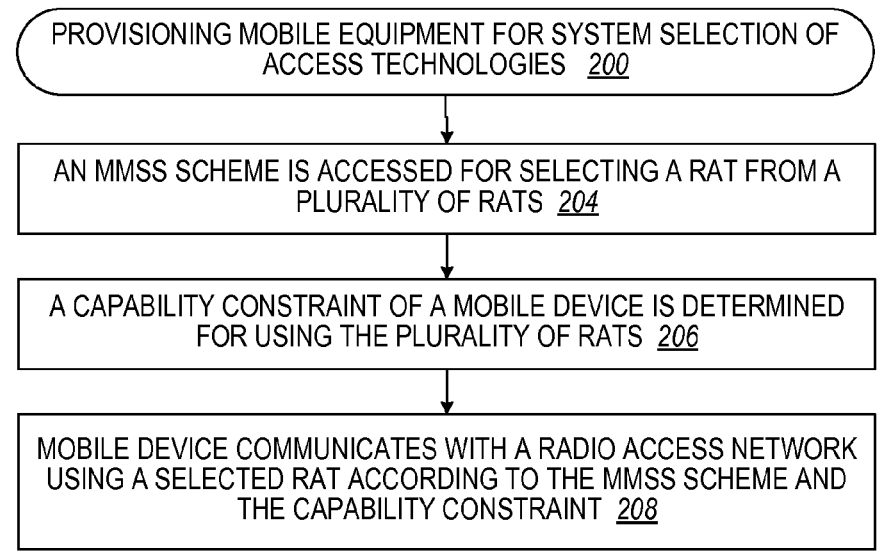
FIG. 2A illustrates a flow diagram for a methodology for user equipment to be provisioned for multimode system selection.

In FIG. 2A, a methodology or sequence of operations 200 is depicted for provisioning mobile equipment or smart card for system selection of air-interface/access technologies. An MMSS scheme is accessed for selecting a RAT from a plurality of RATs (block 204). A capability constraint of a mobile device is determined for using the plurality of RATs (block 206). The mobile device communicates with a radio access network using a selected RAT according to the MMSS scheme and the capability constraint (block 208).

Figure 2B:
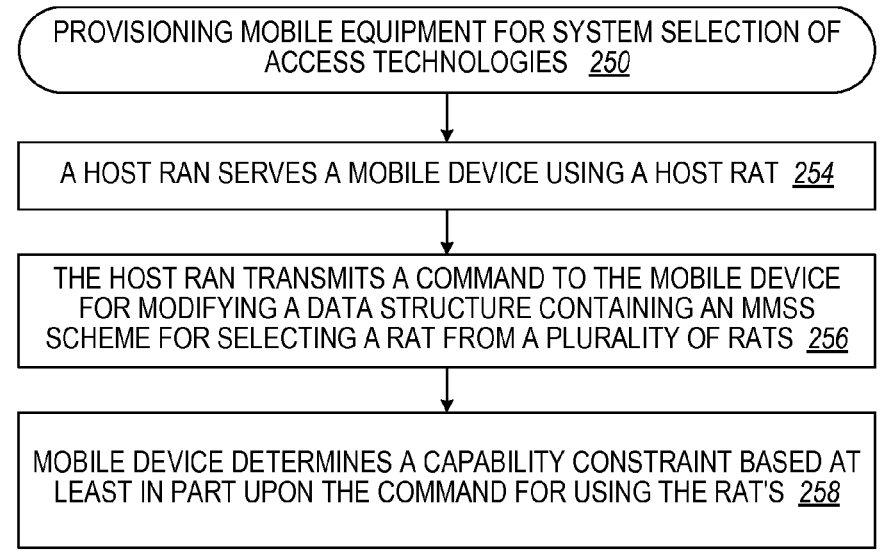
FIG. 2B illustrates a flow diagram for a methodology for a network to provision user equipment for multimode system selection.

In FIG. 2B, a methodology or sequence of operations 250 is depicted for provisioning mobile equipment or smart card for system selection of air-interface/access technologies. A host RAN serves a mobile device using a host RAT (block 254). The host RAN transmits a command to the mobile device for modifying a data structure containing an MMSS scheme for selecting a RAT from a plurality of RATs (block 256), wherein the mobile device determines a capability constraint based at least in part upon the command for using the plurality of radio access technologies (block 258).

Figure 3:
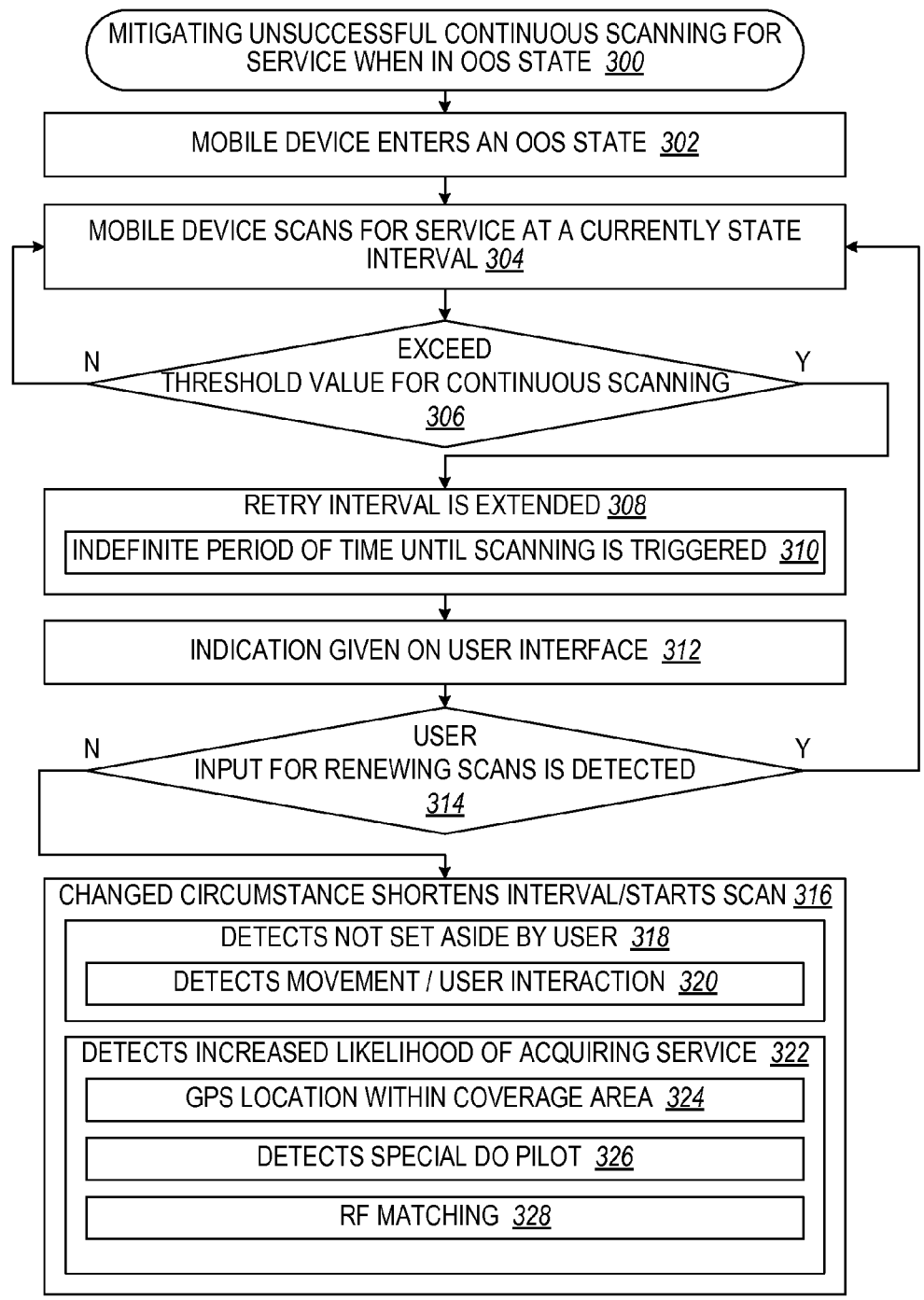
FIG. 3 illustrates a flow diagram for a methodology or sequence of operation for mitigating unsuccessful continuous scanning for service when in an Out-of-Service (OoS) state.

In FIG. 3, a methodology or sequence of operation 300 is depicted for mitigating unsuccessful continuous scanning for service when in an OoS state. In block 302, the mobile device enters an OoS state. At a currently state interval, the mobile device scans for service (block 304). After exceeding a threshold value (e.g., time, number of tries, etc.) for continuous scanning (block 306), a retry interval is extended (block 308). The extended period can include an indefinite period of time until scanning is triggered again (block 310). For instance, an indication can be given on a user interface (block 312). A user input for renewing scans is detected (block 314). If so, scanning resumes in block 304, perhaps with the initial default interval. Alternatively or in addition, the interval between scans can be shortened or scanning triggered by a changed circumstance (block 316). For instance, the mobile device can detect that it has not been set aside by a user (block 318). For another instance, the mobile device detects movement or detects other types of interaction (e.g., unrelated user interface inputs) (block 320). Alternatively or in addition, the mobile device can detect a change in the likelihood of acquiring service (block 322). For example, the mobile device can determine a GPS location that is less likely or more likely to be within coverage range (block 324). The mobile device could detect a special DO pilot (block 326). The mobile device could perform Radio Frequency (RF) matching (e.g., Wi-Fi patterns) that inform the mobile device of a likelihood of detecting service (block 328).

Figure 4A:
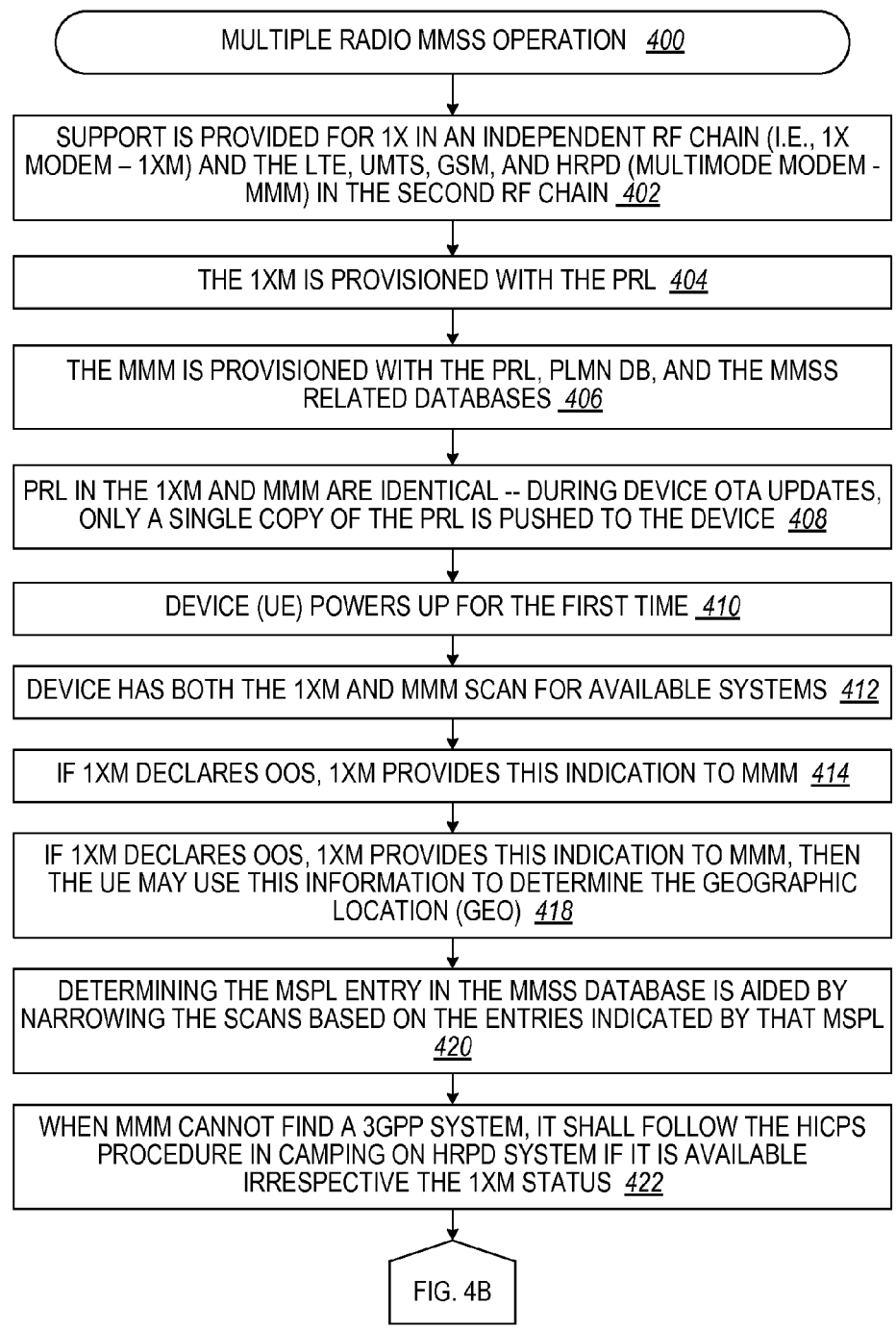
Figure 4B:
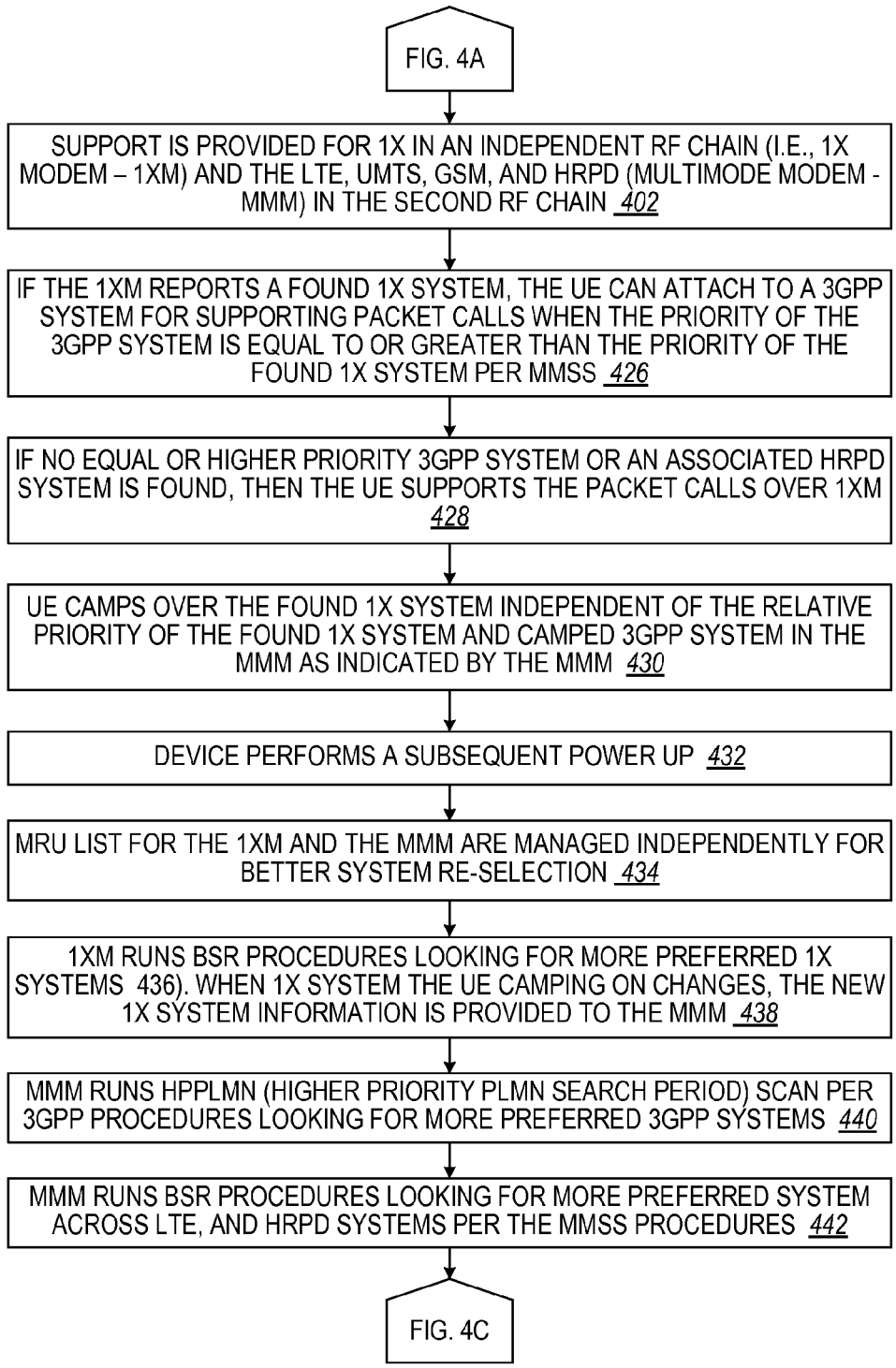
Figure 4C:
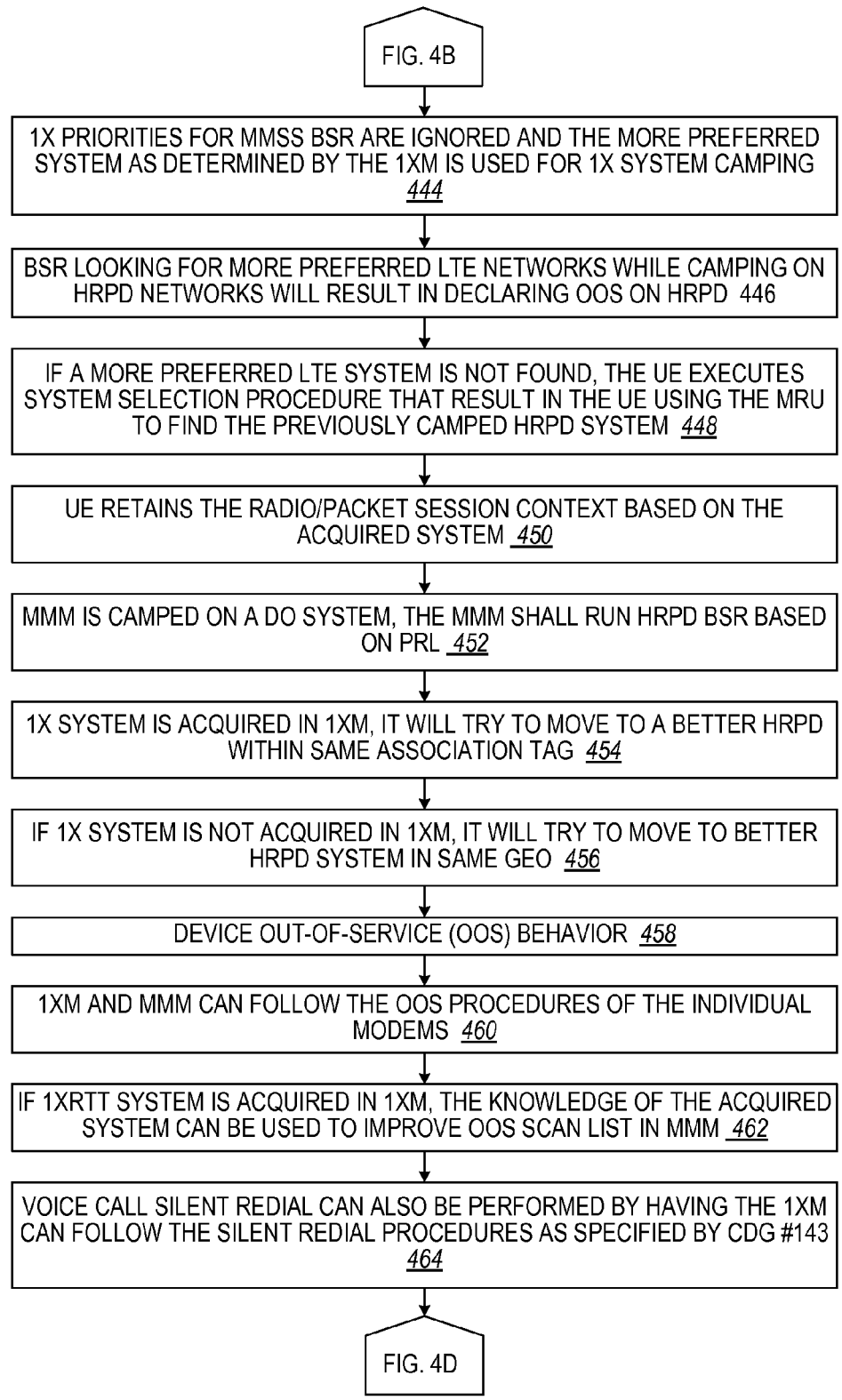

In FIGS. 4A-4C, a methodology or sequence of operations 400 is depicted for multiple radio MMSS operation. In particular, aspects address E-UTRA to cdma2000 redirection feature. User equipment (UE) behavior is described for LTE multimode devices with SVLTE operation in finding 3GPP and 3GPP2 systems allowing for simultaneous camping on LTE+1x system and HRPD+1x system.

With particular reference to FIG. 4A, support is provided for 1x in an independent RF chain (i.e., 1x Modem—1xM) and the LTE, UMTS, GSM, and HRPD (Multi-Mode Modem—MMM) in the second RF chain (block 402). The 1x M is provisioned with the PRL. In particular, the PRL is stored on a smart card. (block 404). The MMM is provisioned with the PRL, PLMN DB, and the MMSS related databases. In particular, these data structures are stored on the smart card (block 406). The PRL in the 1xM and MMM are identical; during device OTA updates, only a single copy of the PRL is pushed to the device (block 408).

The device (i.e., UE) powers up for the first time (block 410). The device has both the 1xM and MMM scan for available systems (block 412). If the 1xM declares OOS, the 1xM provides this indication to MMM (block 414). If the 1xM finds an available system before the MMM, then the UE may use this information to determine the geographic location (GEO) (block 418). Hence, determining the MSPL entry in the MMSS database is aided by narrowing the scans based on the entries indicated by that MSPL (block 420).

When MMM cannot find a 3GPP system, it shall follow the HICPS procedure in camping on HRPD system if it is available irrespective the 1xM status (block 422).

Continuing with FIG. 4B, if the 1xM reports a found 1x system, the UE shall attach to HRPD systems associated with the found 1x system based on the procedures defined in CDG #143 (block 424). One of ordinary skill in the art would recognize this as referencing CDG, "Recommended System Selection Requirements for 1x and 1xEV-DO-Capable Terminals", CDG Doc #143, v1.0, Mar. 15, 2007.

If the 1xM reports a found 1x system, the UE can attach to a 3GPP system for supporting packet calls when the priority of the 3GPP system is equal to or greater than the priority of the found 1x system per MMSS (block 426).

If no equal or higher priority 3GPP system or an associated HRPD system is found, then the UE supports the packet calls over 1xM (block 428).

The UE camps over the found 1x system independent of the relative priority of the found 1x system and camped 3GPP system in the MMM as indicated by the MMM (block 430).

The device performs a subsequent power up (block 432).

The Most Recently Used (MRU) list for the 1xM and the MMM are managed independently for better system re-selection (block 434).

The 1xM runs Better System Reselection (BSR) procedures looking for more preferred 1x systems (block 436). When 1x system the UE camping on changes, the new 1x system information is provided to the MMM (block 438).

The MMM runs HPPLMN (Higher Priority PLMN search period) scan per 3GPP procedures looking for more preferred 3GPP systems (block 440).

Continuing in FIG. 4C, the MMM runs BSR procedures looking for more preferred system across LTE, and HRPD systems per the MMSS procedures (block 442). The 1x priorities for MMSS BSR are ignored and the more preferred system as determined by the 1xM is used for 1x system camping (block 444).

BSR looking for more preferred LTE networks while camping on HRPD networks will result in declaring OOS on HRPD (block 446). If a more preferred LTE system is not found, the UE executes system selection procedure that result in the UE using the MRU to find the previously camped HRPD system (block 448). The UE retains the radio/packet session context based on the acquired system (block 450).

If MMM is camped on a DO system, the MMM shall run HRPD BSR based on PRL (block 452).

If 1x system is acquired in 1xM, it will try to move to a better HRPD within same association tag (block 454).

If 1x system is not acquired in 1xM, it will try to move to better HRPD system in same GEO (block 456).

Device Out-Of-Service (OoS) behavior can be warranted (block 458).

The 1xM and MMM can follow the OoS procedures of the individual modems (block 460).

If 1xRTT system is acquired in 1xM, the knowledge of the acquired system can be used to improve OoS scan list in MMM (block 462).

Voice call silent redial can also be performed by having the 1xM can follow the silent redial procedures as specified by CDG #143 (block 464).

Packet call silent redial for MMM can follow the procedures specified for LTE multimode devices except for looking for 1x systems. The UE does not transition across MMM and 1x for silent redial functionality (block 466).

Continuing in FIG. 4D, after Redirection from LTE to (e)HRPD or Reselection/BSR from LTE to (e)HRPD, the association tag will be ignored if the 1x system acquired in 1xM and new DO are not associated. Follow CDG #143 procedures to move to an associated HRPD system (block 468).

When the UE is camped on a 1xRTT system that has a higher preference than the acquired system in the MMM, the packet session can be supported over the 1xM. MMM continues to look for LTE and (e)HRPD systems that equal or higher preference that the currently acquired 1xRTT system in the 1xM (block 470).

In an exemplary aspect, implementations can provide a means to select one among multiple MMSS schemes. To that end, a new Elementary Field (EF), additions to an existing EF, in the smart card (UICC, R-UIM, and/or SIM) can lists the various MMSS schemes and indicates which are allocated or activated.

In another aspect, a new over-the-air (OTA) message (e.g., in 3GPP2 OTASP) can be defined that conveys this information from the network to the mobile station (MS). This OTA message can also provide location information to indicate which MMSS scheme to use in which geographical region (e.g., use the MMSS-3GPP PLMN-based approach when in certain Europe countries).

For MMSS-3GPP2, a new EF in the smart card (e.g., R-UIM, CSIM/SIM, or UICC) that indicates whether the MS could or should use 3GPP2-MMSS.

In FIG. 5, a sample EF definition 500 for MMSS Selection ($EF_{MMSS\_Selection}$) can indicate if Multimode System Selection System is activated. The contents can contain at least one byte. Further bytes may be included.

In FIG. 6, an illustrative control structure 600 for the EF of FIG. 5 is depicted. Additional flags could be added, such as b2=0/1 for 3GPP PLMN-based MMSS Deactivated, etc.

The present innovation can provide a means to select (enable/disable) each of the various air-interface technologies/access technologies:

First, each radio interface supported by the operator could be provisioned with a flag in the MS indicating whether that AI shall be de-activated or activated. Or that AI should basically be extracted out of the MMSS scheme. The AI could refer to: (a) a specific AI (e.g., GSM or HRPD); (b) a broader standards-based AI (e.g., 3GPP AI's, 3GPP2 AI's, WiMAX AI's) or other AI's such as Wi-Fi, Bluetooth or others.

Second, this information could also be location-based: (a) In certain geographical regions where certain AIs are known to be absent, the MS could then be provisioned such that those AIs are de-activated in those regions. (b) For example, if the handset is in a European country with only 3GPP, all 3GPP2 radios AI's could be de-activated. (c) This saves battery power and can improve system selection performance (e.g., reduced time to scan).

Third, new MMSS EFs (Elementary Files) can be defined on smart cards (e.g., CSIM, R-UIM and VSIM). In the binary form representation of MMSS parameters, the newly introduced EFs use the same data structure as in the OTASP MMSS request/response messages.

In FIG. 7, if service n42 is allocated, this EF ($EF_{MMSSModeSettings}$) 700 can be present. This EF contains the MMSS Mode Settings.

In FIG. 8, if service n42 is allocated, then an EF for MMSS Location Associated Priority List ($EF_{MLPL}$) 800 can present.

5.2.108 $EF_{MSPL}$ (MMSS System Priority List)

In FIG. 9, if service n42 is allocated, this EF 900 can contain the MMSS System Priority List.

In FIG. 10, if service n42 is allocated, this EF ($EF_{MMSSWLAN}$) 1000 can contain the MMSS WLAN configuration.

With regard to defining new MMSS Commands on smart cards, in 3GPP2 C.S0065 CSIM specification, the following new texts are being proposed. Similar definitions apply to R-UIM and VSIM specifications too.

Note that the following command definitions are based on the approach of enhancing the existing CSIM commands defined in 3GPP2 C.S0065 to support the new MMSS commands and making references to those C.S0065 definitions in C.S0023 without replicating the definitions in C.S0023.

One alternative is to define similar new commands in 3GPP2 C.S0023 R-UIM specification and make references to those C.S0023 definitions in C.S0065 without replicating the definitions in C.S0065.

With regard to OTASP/OTAPA-related commands, a generic configuration request can have the following functional description. This command performs several 'configuration request' functions, i.e.: Configuration Request, SSPR Configuration Request, PUZL Configuration Request, 3GPD Configuration Request, MMS Configuration Request and System Tag Configuration Request which corresponds to Configuration Request/Response, SSPR Configuration Request/Response, PUZL Configuration Request/Response, 3GPD Configuration Request/Response messages, MMS Configuration Request/Response and System Tag Configuration Request/Response specified in [7].

Those 'configuration request' functions are differentiated by P2 value.

Command parameters and data:

TABLE 1

| Code | Value |
| --- | --- |
| CLA | As specified in Section 8.1.1 |
| INS | '54' |
| P1 | '00' |
| P2 | See 0 |
| Lc | See below |
| Data | See below |
| Le | '00', or maximum length of data expected in response |

TABLE 2

| Coding of P2 | | | | | | | | |
| --- | --- | --- | --- | --- | --- | --- | --- | --- |
| b8 | b7 | b6 | b5 | b4 | b3 | b2 | b1 | Meaning |
| 0 | 0 | 0 | 0 | 0 | 0 | 0 | 0 | Configuration Request |
| 0 | 0 | 0 | 0 | 0 | 0 | 0 | 1 | SSPR Configuration Request |
| 0 | 0 | 0 | 0 | 0 | 0 | 1 | 0 | PUZL Configuration Request |
| 0 | 0 | 0 | 0 | 0 | 0 | 1 | 1 | 3GPD Configuration Request |
| 0 | 0 | 0 | 0 | 0 | 1 | 0 | 0 | MMS Configuration Request |
| 0 | 0 | 0 | 0 | 0 | 1 | 0 | 1 | System Tag Configuration Request |
| 0 | 0 | 0 | 0 | 0 | 1 | 1 | 0 | MMSS Configuration Request |

The command parameters/data, input parameters and response parameters/data are coded as below. Command parameters/data:

TABLE 3

| Octet(s) | Description | Length |
| --- | --- | --- |
| 1 | Block ID | 1 byte |

This command requests MMSS configuration details of a single block of data and forms a subset of the "MMSS Configuration Request Message" as described in [7], section 4.5.1.25.

Response parameters/data:

TABLE 4

| Octet(s) | Description | Length |
| --- | --- | --- |
| 1 | Block ID | 1 byte |
| 2 | Block Length | 1 byte |

TABLE 4-continued

| Octet(s) | Description | Length |
|---|---|---|
| 3 | Result Code | 1 byte |
| 4 – Le | Parameter Data | Le – 3 bytes |

\* Note: Le = Length of Parameter Data + 3.

This response provides MMSS configuration details of a single block of data and forms a subset of the "MMSS Configuration Response Message" as described in [7], section 3.5.1.25.

With regard to a generic download request, consider the following functional description. This command performs several 'download request' functions, i.e.: Download Request, SSPR Download Request, PUZL Download Request, 3GPD Download Request, MMS Download Request and System Tag Download Request which corresponds to Download Request/Response, SSPR Download Request/Response, PUZL Download Request/Response and 3GPD Configuration Request/Response messages, MMS Configuration Request/Response and System Tag Configuration Request/Response specified in [7].

Those 'download request' functions are differentiated by P2 value.

Command parameters and data:

TABLE 5

| Code | Value |
|---|---|
| CLA | As specified in Section 8.1.1 |
| INS | '56' |
| P1 | '00' |
| P2 | See 0 |
| Lc | See below |
| Data | See below |
| Le | Maximum length of data expected in response |

TABLE 6

Coding of P2

| b8 | b7 | b6 | b5 | b4 | b3 | b2 | b1 | Meaning |
|---|---|---|---|---|---|---|---|---|
| 0 | 0 | 0 | 0 | 0 | 0 | 0 | 0 | Download Request |
| 0 | 0 | 0 | 0 | 0 | 0 | 0 | 1 | SSPR Download Request |
| 0 | 0 | 0 | 0 | 0 | 0 | 1 | 0 | PUZL Download Request |
| 0 | 0 | 0 | 0 | 0 | 0 | 1 | 1 | 3GPD Download Request |
| 0 | 0 | 0 | 0 | 0 | 1 | 0 | 0 | MMS Download Request |
| 0 | 0 | 0 | 0 | 0 | 1 | 0 | 1 | System Tag Download Request |
| 0 | 0 | 0 | 0 | 0 | 1 | 1 | 0 | MMSS Download Request |

MMSS Download Request command data (P2='06').

The command parameters/data, input parameters and response parameters/data are coded as below.

Command parameters/data:

TABLE 7

| Octet(s) | Description | Length |
|---|---|---|
| 1 | Block ID | 1 byte |
| 2 | Block Length | 1 byte |
| 3 – Lc | Parameter Data | Lc – 2 bytes |

This command requests the MMSS download of a single block of data and forms a subset of the "MMSS Download Request Message". Note: Lc=Length of Parameter Data+2.

Response parameters/data:

TABLE 8

| Octet(s) | Description | Length |
|---|---|---|
| 1 | Block ID | 1 byte |
| 2 | Result Code | 1 byte |

This response pertains to a single block of data and forms a subset of the "MMSS Download Response Message".

A new Service Number for MMSS can be defined.

CSIM, R-UIM and VSIM specifications can reflect definitions to support the present innovations as provided below with regard to an $EF_{CST}$ (CSIM Service Table). This EF indicates which services are available. If a service is not indicated as available in the CSIM, the mobile equipment does not select this service.

TABLE 9

| Services: | |
|---|---|
| Service n1: | Local Phone book |
| Service n2: | Fixed Dialing Numbers (FDN) |
| Service n3: | Extension 2 |
| Service n4: | Service Dialing Numbers (SDN) |
| Service n5: | Extension 3 |
| Service n6: | Short Message Storage (SMS) |
| Service n7: | Short Message Parameters |
| Service n8: | HRPD |
| Service n9: | Service Category Program for BC-SMS |
| Service n10: | CDMA Home Service Provider Name |
| Service n11: | Data Download via SMS Broadcast |
| Service n12: | Data Download via SMS-PP |
| Service n13: | Call Control |
| Service n14: | 3GPD-SIP |
| Service n15: | 3GPD-MIP |
| Service n16: | AKA |
| Service n17: | IP-based Location Services (LCS) |
| Service n18: | BCMCS |
| Service n19: | Multimedia Messaging Service (MMS) |
| Service n20: | Extension 8 |
| Service n21: | MMS User Connectivity Parameters |
| Service n22: | Application Authentication |
| Service n23: | Group Identifier Level 1 |
| Service n24: | Group Identifier Level 2 |
| Service n25: | De-Personalization Control Keys |
| Service n26: | Cooperative Network List |
| Service n27: | Outgoing Call Information (OCI) |
| Service n28: | Incoming Call Information (ICI) |
| Service n29: | Extension 5 |
| Service n30: | Multimedia Storage |
| Service n31: | Image (EFIMG) |
| Service n32: | Enabled Services Table |
| Service n33: | Capability Configuration Parameters (CCP) |
| Service n34: | SF_EUIMID-based EUIMID |
| Service n35: | Messaging and 3GPD Extensions |
| Service n36: | Root Certificates |
| Service n37: | Browser |
| Service n38: | Java |
| Service n39: | Reserved for CDG |
| Service n40: | Reserved for CDG |
| Service n41: | IPv6 |
| Service n42: | MMSS |

Record based provisioning and storage of MMSS parameters can be provided. Consider new OTASP commands for MMSS records. Existing OTASP commands manage the whole MLPL and MSPL parameters as a whole. In order to manage individual fields and records in MLPL and MSPL information of MMSS, it is proposed to add new parameter blocks in 3GPP2 C.S0016 OTASP spec to insert, update and delete those specific MMSS records. These parameter blocks will be used in the MMSS Download Request message and/or MMSS Configuration Request message.

MLPL Insert: Insert a new record
MLPL Update: Update a record
MLPL Delete: Delete a record
MLPL Read: Read a record
MSPL Insert: Insert a new record
MSPL Update: Update a record
MSPL Delete: Delete a record
MSPL Read: Read a record When managing these records, each record is indexed by the index number within those records. Since these are not in the C.S0016 yet, this new index number should be added too for each record.

With regard to storage of MMSS records, the proposed MMSS EFs in can be in binary form. The alternative will be to define the MLPL and MSPL records as records within the EFs of Linear Fixed type.

Another alternative will be to define those records as TLV objects in the EFs of Transparent type.

Since MLPL and MSPL both have some header information (e.g., MLPL or MSPL Size and ID), they can be stored as separate EFs (e.g., $EF_{MLPLheader}$ and $EF_{MSPLheader}$).

Smart Card commands for MMSS records can be provided. The proposed MMSS commands in smart cards manage the whole MLPL and MSPL parameter blocks. It is proposed to introduce additional smart card commands to manage those blocks in terms of individual records. The commands will be one-to-one corresponding to the record based commands in OTASP. For example, the following smart cards commands are defined:

MLPL Insert: Insert a new record;
MLPL Update: Update a record;
MLPL Delete: Delete a record;
MLPL Read: Read a record;
MSPL Insert: Insert a new record;
MSPL Update: Update a record;
MSPL Delete: Delete a record; and
MSPL Read: Read a record.

MMSS enhancements for LTE and IOTA-DM—Currently MMSS parameters do not cover LTE. LTE system information can be added to the MMSS parameters similar to the GSM/UMTS system information.

For example:
Add a new value for SYS_TYPE in MSPL: LTE '00000011'.
Add a new bit for AIR_INT_TYPE: LTE supported
Define LTE System Location Tag The OTASP enhancements and additions for MMSS are also applicable to IOTA-DM. IOTA-DM as defined in 3GPP2 C.S0064 to support IP based over-the-air provisioning using OMA's Device Management framework. Similar OTASP commands and data block definitions can be added to IOTA-DM definitions.

For example:
Add a new Managed Object for MMSS
Define the parameters within that new Managed Object to include those MMSS parameters from OTASP (e.g., Mode Settings, MLPL header and records, MSPL header and records . . . ).

A scheme to manage the common services on the Smart Cards can be added using a new Generic Service Table.

Under the MF (Master File) on the UICC with CSIM/USIM or on the R-UIM/SIM, create a new EF called $EF_{GST}$ (Generic Service Table) or something to this effect. In this table, the following services can be defined so that they can be activated/deactivated individually on the Smart Card.

ADN (Abbreviated Dialing Numbers);
FDN (Fixed Dialing Number);
LDN (Last Dialed Number);
SDN (Service Dialing Numbers);
Multimedia Storage;
Image; and
MMSS (i.e., the new service that is being defined and standardized).

Once a service is activated in this table, it is available for both CSIM and USIM (and both R-UIM and SIM) to access. Once a service is deactivated, it is not available for both CSIM and USIM. The EFs and commands that are covered by a particular Generic Service are present under the MF and are not present under CSIM ADF or USIM ADF (and not under $DF_{CDMA}$ or $DF_{GSM}$).

In one aspect, the intent of the EF-GST can be to manage those services 'outside of' or possibly common to USIM and CSIM (as well as SIM and R-UIM). For example, this EF GST could indicate whether or not MMSS is available on the UICC.

For the existing services such as Multimedia Storage which is already present in both CSIM and USIM service tables, the Multimedia Storage in the Generic Service Table will override the corresponding number in CSIM (or R-UIM) service table and USIM (or SIM) service table (i.e., that latter two will be ignored).

When a generic service is not activated, its associated EFs and commands are not supported by the card, so that memory space does not need to be allocated for those EFs and command processing logic.

Applicable standard documents: The new $EF_{GST}$ can be defined in C.S0074, the 3GPP2 UICC specification for CSIM/USIM based smart cards, under the MF (Master File).

The new $EF_{GST}$ can be defined in C.S0023, the 3GPP2 R-UIM specification for R-UIM/SIM, under the MF.

Define a scheme to manage the services on the Smart Cards over CDMA OTASP system An OTASP command "Service Change Request Message" can be created for the network to activate/deactivate the service on the R-UIM, CSIM, SIM, USIM, UICC (for generic services), R-UIM/SIM (for generic services), ISIM, etc.

A Forward Link Messages can have the following new entry:

Service Change Request Message '00011000' (the next available value).

TABLE 10

| Field | Length (bits) | |
| --- | --- | --- |
| OTASP_MSG_TYPE | 8 | this should be the new Service Change Request Message |
| NUM_SERVICES | 8 | |
| NUM_SERVICES occurrences of the following fields: | | |
| CARD_TYPE | 8 | 0: R-UIM; 1: CSIM; 2: R-UIM/SIM Generic; 3: UICC/CSIM/USIM Generic; 4: ISIM; 5: SIM; 6: USIM; . . . |

TABLE 10-continued

| Field | Length (bits) | |
|---|---|---|
| SERVICE_NUMBER | 8 | the service number within the above cards' service table |
| ACTIVATION_STATUS | 8 | Bit 1: 0: Not Allocated; 1: Allocated. Bit 2: 0: Not Activated; 1: Activated. |

Also create a new OTASP command "Service Configuration Request" for the network to query the current value of a service on the R-UIM/CSIM.

In C.S0016, Table 4.5-1 Forward Link Messages will have the following new entry:

Service Configuration Request Message '00011001' (the next available value) 4.5.1.2y Add a new section 4.5.1.2y Service Configuration Request Message to describe the message format:

TABLE 11

| Field | Length (bits) | |
|---|---|---|
| OTASP_MSG_TYPE | 8 | this should be the new Service Configuration Request Message |
| NUM_SERVICES | 8 | |
| NUM_SERVICES occurrences of the following fields: | | |
| CARD_TYPE | 8 | |
| SERVICE_NUMBER | 8 | |

Now we need to define new commands in the reverse link messages.

In Table 3.5-1 Reverse Link Messages, add the following new messages:

Service Change Response Message '00011000' (the next available value) 3.5.1.2x

Service Configuration Response Message '00011001' (the next available

TABLE 12

| Field | Length (bits) | |
|---|---|---|
| OTASP_MSG_TYPE | 8 | this should be the new Service Change Request Message |
| NUM_SERVICES | 8 | |
| NUM_SERVICES occurrences of the following fields: | | |
| CARD_TYPE | 8 | |
| SERVICE_NUMBER | 8 | |
| ACTIVATION_STATUS | 8 | The status after the service change succeeded or failed. |
| RESULT_CODE | 8 | OK, Cannot change service, Invalid Service Number, Other. |

TABLE 13

| Field | Length (bits) | |
|---|---|---|
| OTASP_MSG_TYPE | 8 | This should be the new Service Change Request Message |
| NUM_SERVICES | 8 | |
| NUM_SERVICES occurrences of the following fields: | | |
| CARD_TYPE | 8 | |
| SERVICE_NUMBER | 8 | |
| ACTIVATION_STATUS | 8 | Current status of a service. |

TABLE 13-continued

| Field | Length (bits) | |
|---|---|---|
| RESULT_CODE | 8 | OK; Cannot change service; Invalid Service Number; Other. |

In the CSIM and R-UIM specifications, the following CSIM/R-UIM commands related to OTASP can be added to support the generic service management from the network to the R-UIM.

In the 3GPP2 C.S0065 CSIM specification, the following can be implemented. Similar definitions apply to R-UIM and VSIM specifications too.

For OTASP/OTAPA-related commands, a generic configuration request can have the following functional description. This command performs several 'configuration request' functions, i.e.: Configuration Request, SSPR Configuration Request, PUZL Configuration Request, 3GPD Configuration Request, MMS Configuration Request and System Tag Configuration Request which corresponds to Configuration Request/Response, SSPR Configuration Request/Response, PUZL Configuration Request/Response, 3GPD Configuration Request/Response messages, MMS Configuration Request/Response and System Tag Configuration Request/Response.

Those 'configuration request' functions are differentiated by P2 value, as depicted by these command parameters and data:

TABLE 14

| Code | Value |
|---|---|
| CLA | As specified in Section 8.1.1 |
| INS | '54' |
| P1 | '00' |
| P2 | See 0 |
| Lc | See below |
| Data | See below |
| Le | '00', or maximum length of data expected in response |

TABLE AA

| b8 | b7 | b6 | b5 | b4 | B3 | b2 | b1 | Meaning |
|---|---|---|---|---|---|---|---|---|
| 0 | 0 | 0 | 0 | 0 | 0 | 0 | 0 | Configuration Request |
| 0 | 0 | 0 | 0 | 0 | 0 | 0 | 1 | SSPR Configuration Request |
| 0 | 0 | 0 | 0 | 0 | 0 | 1 | 0 | PUZL Configuration Request |
| 0 | 0 | 0 | 0 | 0 | 0 | 1 | 1 | 3GPD Configuration Request |
| 0 | 0 | 0 | 0 | 0 | 1 | 0 | 0 | MMS Configuration Request |
| 0 | 0 | 0 | 0 | 0 | 1 | 0 | 1 | System Tag Configuration Request |
| 0 | 0 | 0 | 0 | 0 | 1 | 1 | 0 | Service Configuration Request |

The command parameters/data, input parameters and response parameters/data are coded as below.

TABLE 15

| Octet(s) | Description | Length |
|---|---|---|
| 1 | Block ID | 1 byte |

This command requests Service configuration details of a single block of data and forms a subset of the "Service Configuration Request Message" of this disclosure. Response parameters/data:

TABLE 16

| Octet(s) | Description | Length |
|---|---|---|
| 1 | Block ID | 1 byte |
| 2 | Block Length | 1 byte |
| 3 | Result Code | 1 byte |
| 4 – Le | Parameter Data | Le – 3 bytes |

* Note: Le = Length of Parameter Data + 3.

This response provides Service configuration details of a single block of data and forms a subset of the "Service Configuration Response Message".

With regard to a generic download request, this command performs several 'download request' functions, i.e.: Download Request, SSPR Download Request, PUZL Download Request, 3GPD Download Request, MMS Download Request and System Tag Download Request which corresponds to Download Request/Response, SSPR Download Request/Response, PUZL Download Request/Response and 3GPD Configuration Request/Response messages, MMS Configuration Request/Response and System Tag Configuration Request/Response specified in [7].

Those 'download request' functions are differentiated by P2 value. Command parameters and data:

TABLE 17

| Code | Value |
|---|---|
| CLA | As specified in Section 8.1.1 |
| INS | '56' |
| P1 | '00' |
| P2 | See 0 |
| Lc | See below |
| Data | See below |
| Le | Maximum length of data expected in response |

Coding of P2:

TABLE 18

| b8 | b7 | b6 | b5 | b4 | b3 | B2 | b1 | Meaning |
|---|---|---|---|---|---|---|---|---|
| 0 | 0 | 0 | 0 | 0 | 0 | 0 | 0 | Download Request |
| 0 | 0 | 0 | 0 | 0 | 0 | 0 | 1 | SSPR Download Request |
| 0 | 0 | 0 | 0 | 0 | 0 | 1 | 0 | PUZL Download Request |
| 0 | 0 | 0 | 0 | 0 | 0 | 1 | 1 | 3GPD Download Request |
| 0 | 0 | 0 | 0 | 0 | 1 | 0 | 0 | MMS Download Request |
| 0 | 0 | 0 | 0 | 0 | 1 | 0 | 1 | System Tag Download Request |
| 0 | 0 | 0 | 0 | 0 | 1 | 1 | 0 | Service Change Request |

Service Change Request command data (P2='06')

The command parameters/data, input parameters and response parameters/data are coded as below. Command parameters/data:

TABLE 19

| Octet(s) | Description | Length |
|---|---|---|
| 1 | Block ID | 1 byte |
| 2 | Block Length | 1 byte |
| 3 – Lc | Parameter Data | Lc – 2 bytes |

This command requests the Service download of a single block of data and forms a subset of the "Service Change Request Message" as described in "2.1 Additions to C.S0016" of this invention document.

Response parameters/data:

TABLE 20

| Octet(s) | Description | Length |
|---|---|---|
| 1 | Block ID | 1 byte |
| 2 | Result Code | 1 byte |

This response pertains to a single block of data and forms a subset of the "Service Change Response Message".

By virtue of the present disclosure, it should be appreciated that innovative functions enable a mobile device to select cdma2000 and non-cdma2000 systems based upon carrier's preferences efficiently, which can be stored on smart cards or device's memory (also known as non-volatile memory or NV). The storage and management of the MMSS parameters and services allow the subscriber to carry/transfer his/her identity from one device to the other while keeping the MMSS parameters on his/her smart cards. The record based provisioning and storage of MMSS parameters provides flexibility in the management of those parameters. The OTASP enhancements can allow the network to dynamically enable/disable services on the handset or R-UIM/CSIM. The new generic service table applies to both R-UIM/SIM and UICC (CSIM/USIM) and avoids duplicate service table entries in two places and solves the out-of-synchronization issue.

Figure 11:
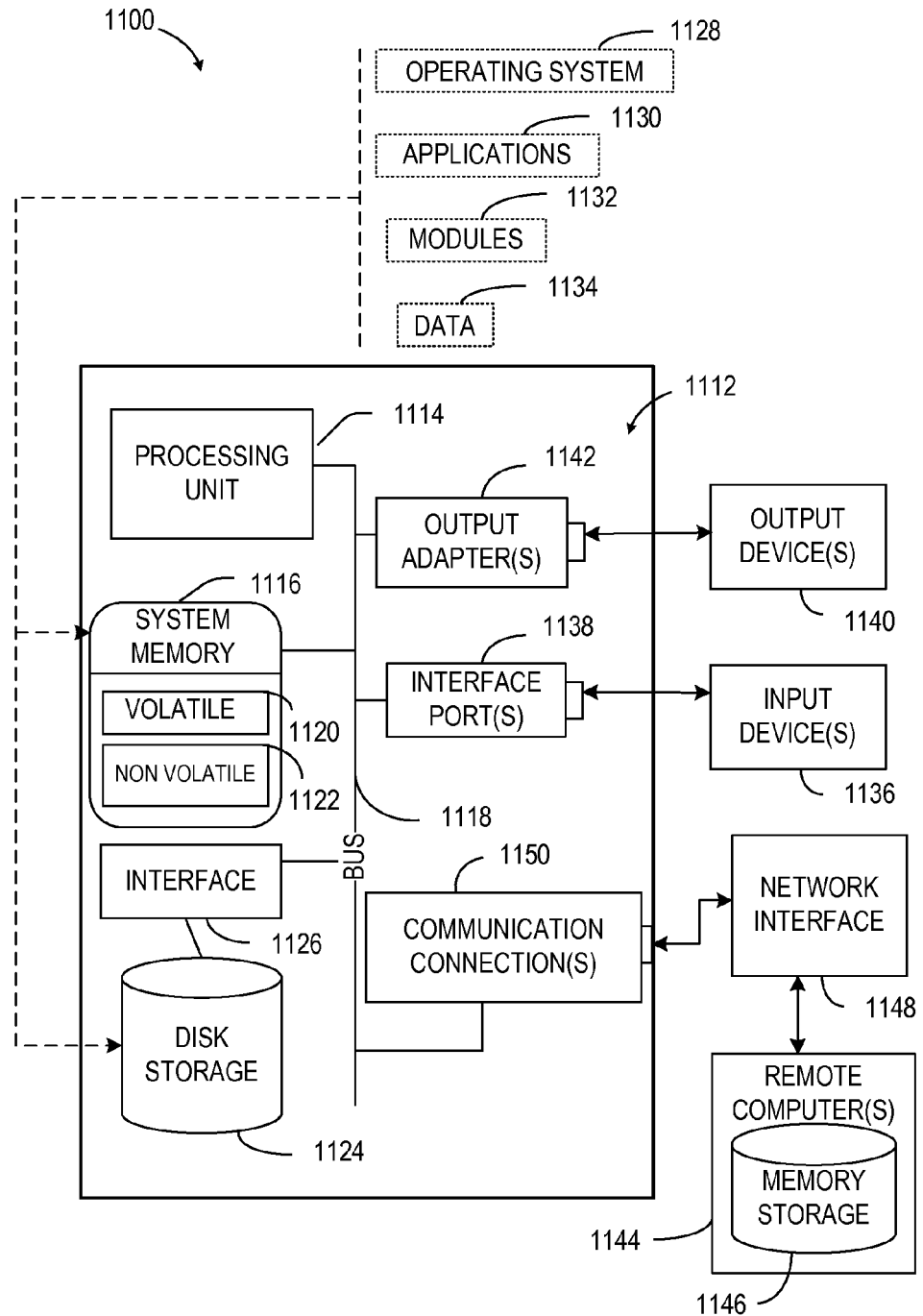
FIG. 11 illustrates a diagram of an exemplary computing environment.

With reference to FIG. 11, an exemplary computing environment 1100 for implementing various aspects of the claimed subject matter includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCM-CIA), Firewire (IEEE 1194), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable programmable ROM (EEPROM), or flash memory. Volatile memory 1120 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the claimed subject matter can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Figure 12:
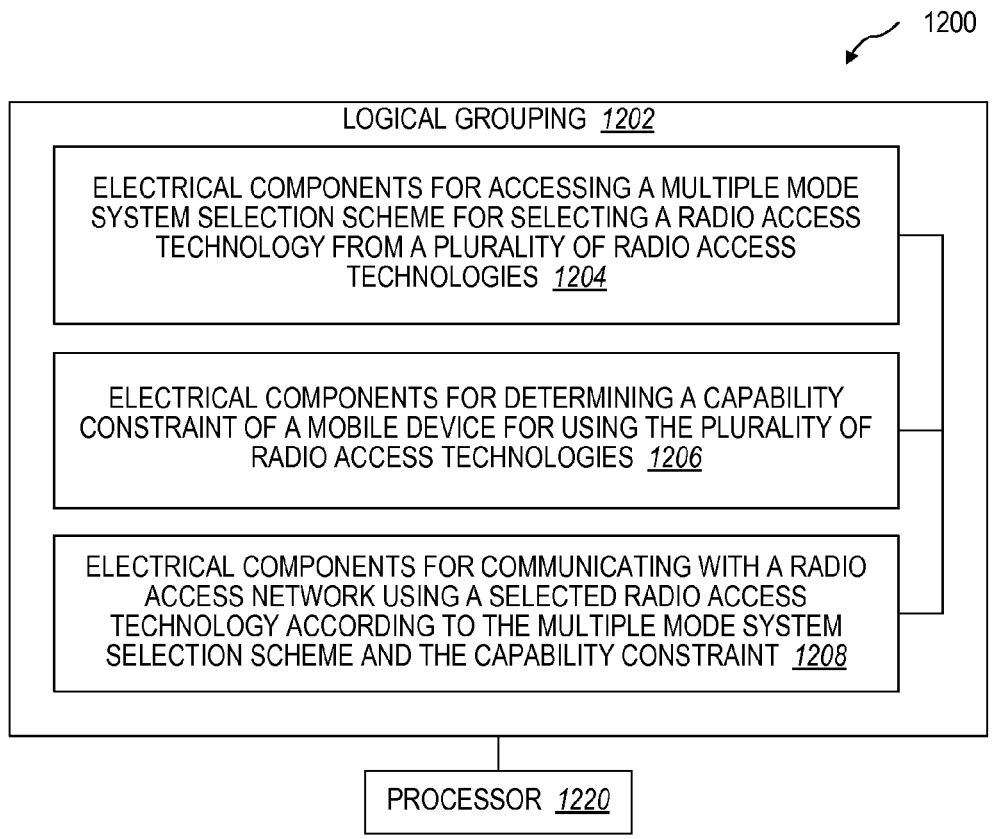
FIG. 12 illustrates a block diagram of a logical grouping of electrical components for provisioning multimode service selection that is incorporated at least in part in user equipment.

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

base nodebase nodeBase nodebase nodeBase nodebase nodebase nodebase nodebase nodebase nodebase nodebase nodeBase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase nodebase node With reference to FIG. 12, illustrated is a system 1200 for provisioning mobile equipment or smart card for system selection of air-interface/access technologies. For example, system 1200 can reside at least partially within user equipment (UE). It is to be appreciated that system 1200 is represented as including functional blocks, which can be functional blocks that represent functions implemented by a computing platform, processor, software, or combination thereof (e.g., firmware). System 1200 includes a logical grouping 1202 of electrical components that can act in conjunction. For instance, logical grouping 1202 can include an electrical component for accessing a multimode system selection scheme for selecting a radio access technology from a plurality of radio access technologies 1204. Moreover, logical grouping 1202 can include an electrical component for determining a capability constraint of a mobile device for using the plurality of radio access technologies 1206. For another instance, logical grouping 1202 can include an electrical component for communicating with a radio access network using a selected radio access technology according to the multimode system selection scheme and the capability constraint 1208. Additionally, system 1200 can include a memory 1220 that retains instructions for executing functions associated with electrical components 1204-1208. While shown as being external to memory 1220, it is to be understood that one or more of electrical components 1204-1208 can exist within memory 1220.

Figure 13:
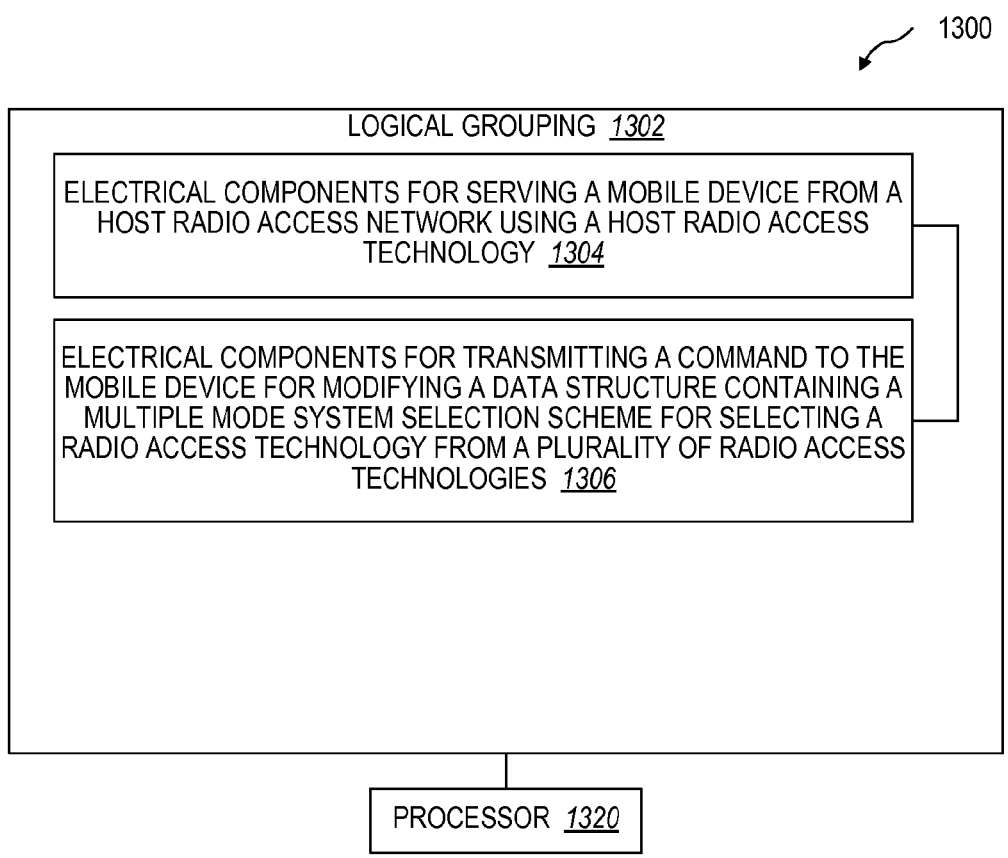
FIG. 13 illustrates a block diagram of a logical grouping of electrical components for provisioning multimode service selection that is incorporated at least in part in a node.

With reference to FIG. 13, illustrated is a system 1300 for provisioning mobile equipment or smart card for system selection of air-interface/access technologies. For example, system 1300 can reside at least partially within a network entity (e.g., evolved base node). It is to be appreciated that system 1300 is represented as including functional blocks, which can be functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component for serving a mobile device from a host radio access network using a host radio access technology 1304. Moreover, logical grouping 1302 can include an electrical component for transmitting a command to the mobile device for modifying a data structure containing a multimode system selection scheme for selecting a radio access technology from a plurality of radio access technologies 1306, wherein the mobile device determines a capability constraint based at least in part upon the command for using the plurality of radio access technologies. Additionally, system 1300 can include a memory 1320 that retains instructions for executing functions associated with electrical components 1304-1306. While shown as being external to memory 1320, it is to be understood that one or more of electrical components 1304-1306 can exist within memory 1320.

Figure 14:
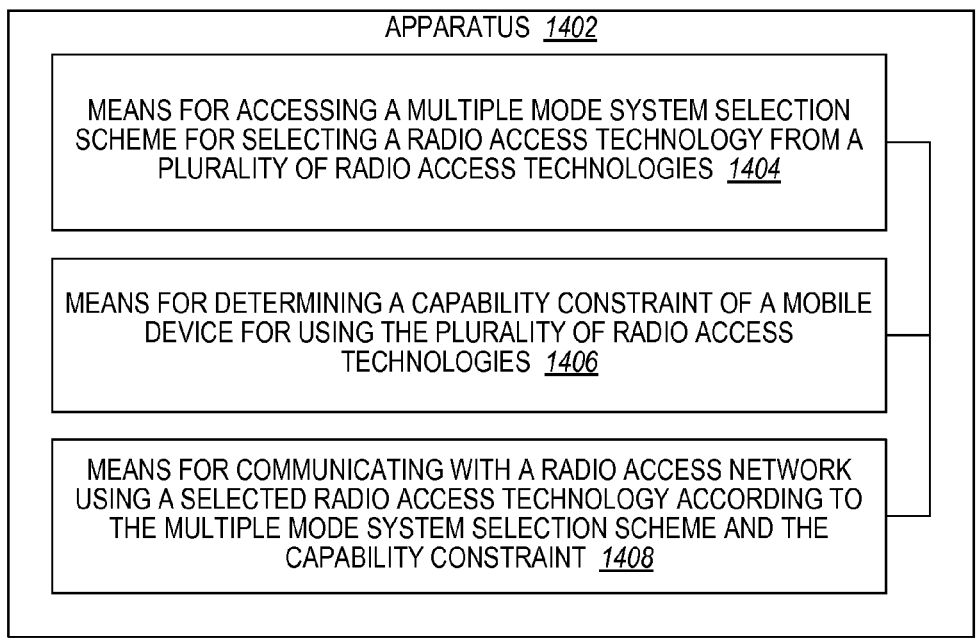
FIG. 14 illustrates a block diagram of an apparatus having means for provisioning multimode service selection.

In FIG. 14, an apparatus 1402 is depicted for provisioning mobile equipment or smart card for system selection of air-interface/access technologies. Means 1404 are provided for accessing a multimode system selection scheme for selecting a radio access technology from a plurality of radio access technologies. Means 1406 are provided for determining a capability constraint of a mobile device for using the plurality of radio access technologies. Means 1408 are provided for communicating with a radio access network using a selected radio access technology according to the multimode system selection scheme and the capability constraint.

Figure 15:
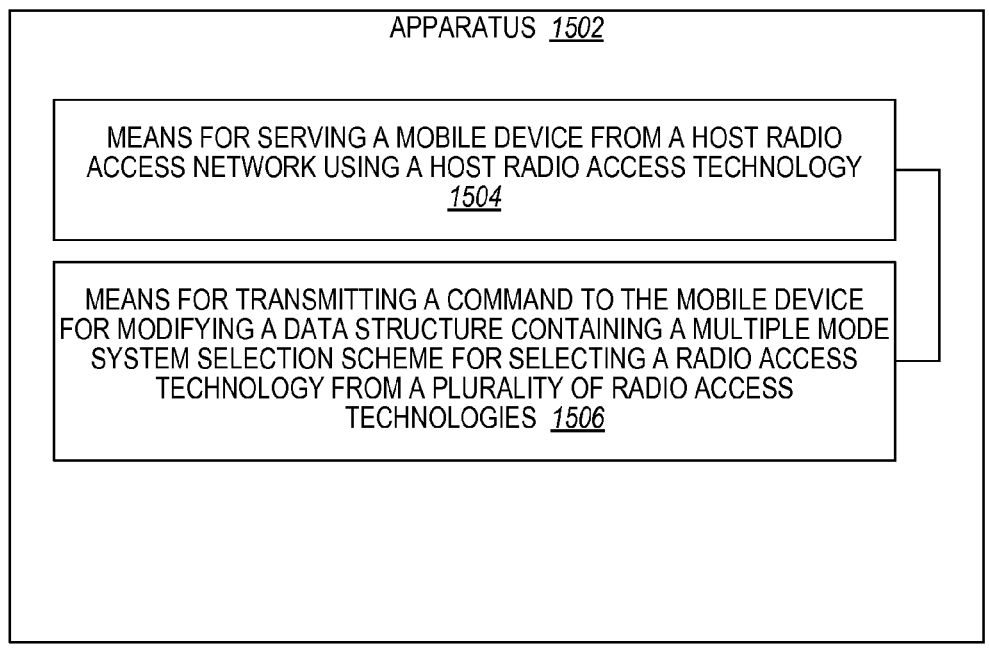
FIG. 15 illustrates a block diagram of an apparatus having means for provisioning multimode service selection.

In FIG. 15, an apparatus 1502 is depicted for provisioning mobile equipment or smart card for system selection of air-interface/access technologies. Means 1504 are provided for serving a mobile device from a host radio access network using a host radio access technology. Means 1506 are provided for transmitting a command to the mobile device for modifying a data structure containing a multimode system selection scheme for selecting a radio access technology from a plurality of radio access technologies, wherein the mobile device determines a capability constraint based at least in part upon the command for using the plurality of radio access technologies.

Variations, modification, and other implementations of what is described herein will occur to those of ordinary skill in the art without departing from the spirit and scope of the disclosure as claimed. Accordingly, the disclosure is to be defined not by the preceding illustrative description but instead by the spirit and scope of the following claims.

What is claimed is:

1. A method for provisioning mobile equipment or smart card for system selection of air-interface/access technologies, comprising:
    selecting a multimode system selection scheme from a plurality of multimode system selection schemes each for selecting a radio access technology from a plurality of radio access technologies;
    determining a capability constraint of a mobile device for using the plurality of radio access technologies, comprising performing handshaking between a computing platform of the mobile device and an integrated circuit card containing a subscriber identifier to a mobile network to indicate each respective supported multimode system selection scheme;
    communicating with a radio access network using a selected radio access technology according to the multimode system selection scheme and the capability constraint; and
    extending an interval between scans for service when the mobile device is determined to be in an out-of-service area, comprising modifying a portion of information saved for each of the plurality of multimode system selection schemes on the mobile device for disabling scanning at least one air interface type in an out-of-service condition of the mobile device.

2. The method of claim 1, wherein selecting the multimode system selection scheme comprises selecting between a 3GPP multimode system selection scheme, a 3GPP2 multimode system selection scheme, and a generalized preferred roaming list multimode system selection scheme.

3. The method of claim 1, wherein determining the capability constraint further comprises determining provisioning of the subscriber identifier of the mobile device for a mobile operator.

4. The method of claim 3, wherein determining provisioning of the subscriber identifier further comprises detecting one of a group consisting of a Removable User Identity Module (R UIM), Universal Integrated Circuit Card (UICC) with CDMA Subscriber Identity Module (CSIM), UICC with Universal Subscriber Identity Module (USIM) and CSIM, and Subscriber Identity Module (SIM).

5. The method of claim 4, further comprising:
    determining provisioning of a second one of the group of smart cards; and
    selectively activating the one and the second one of the group.

6. The method of claim 1, wherein determining the capability constraint further comprises determining a transceiver limitation of the mobile device associated with an air interface.

7. The method of claim 6, wherein determining the transceiver limitation further comprises communicating via a single mode or multimode.

8. The method of claim 6, further comprising storing the transceiver limitation and configuration information received from an operator for a subscriber on a smart card incorporated in the mobile device.

9. The method of claim 6, wherein determining the capability constraint further comprises determining a transceiver limitation of the mobile device being roaming or at home.

10. The method of claim 1, wherein determining the capability constraint further comprises determining a transceiver limitation of the mobile device for communicating on at least one of a group consisting of CDMA2000, 3GPP, 3GPP2, GSM, and WiMAX air interfaces.

11. The method of claim 1, further comprising accessing a first multimode system selection scheme stored on the computing platform and accessing a second multimode system selection scheme stored on the integrated circuit card.

12. The method of claim 1, further comprising:
determining an available plurality of radio access technologies that satisfy the multimode system selection scheme and the capability constraint; and
selecting one of the available plurality of radio access technologies in accordance to a priority setting.

13. The method of claim 1, further comprising receiving a network command to enable or disable a specified radio access technology.

14. The method of claim 1, further comprising accessing the multimode system selection scheme by accessing an elementary file on the integrated circuit card comprising a smart card that is provisioned with the mobile device.

15. The method of claim 1, further comprising receiving a command to modify a locally stored data structure for the multimode system selection scheme by over-the-air service provisioning.

16. The method of claim 1, further comprising:
determining a geographic location of the mobile device; and
accessing the capability constraint that specifies whether the selected radio access technology is available in the geographic location.

17. The method of claim 1, further comprising:
determining a current calendar date; and
accessing the capability constraint that specifies whether the selected radio access technology is available on the current calendar date.

18. The method of claim 1, further comprising accessing the multimode system selection scheme in a generic service table contained in the integrated circuit card comprising a smart card.

19. The method of claim 1, further comprising accessing the multimode system selection scheme to determine an anchor system that serves as a primary selection.

20. The method of claim 1, further comprising accessing the multimode system selection scheme that associates with at least two air-interfaces.

21. The method of claim 1, further comprising:
determining a geographic location of the mobile device; and
accessing the capability constraint that specifies whether a manual selection of a radio access technology is available in the geographic location.

22. The method of claim 1, wherein extending the interval between scans for service further comprises determining that a threshold has been exceeded.

23. The method of claim 1, further comprising extending the interval between scans for service dependent upon a user preference for scanning in the out-of-service area.

24. The method of claim 1, further comprising extending the interval between scans for service dependent upon sensing a lack of user interaction with the mobile device.

25. The method of claim 1, further comprising extending the interval between scans for service dependent upon a location of the mobile device.

26. The method of claim 25, further comprising determining the location of the mobile device based upon a selected one of receiving a geographic positioning signal, detecting a wireless access transmission, matching radio frequency environment to a stored location description, and identifying a cellular pilot that indicates the out-of-service area.

27. At least one processor for provisioning mobile equipment or smart card for system selection of air-interface/access technologies, comprising:
a first module for selecting a multimode system selection scheme from a plurality of multimode system selection schemes each for selecting a radio access technology from a plurality of radio access technologies;
a second module for determining a capability constraint of a mobile device for using the plurality of radio access technologies, comprising performing handshaking between a computing platform of the mobile device and an integrated circuit card containing a subscriber identifier to a mobile network to indicate each respective supported multimode system selection scheme;
a third module for communicating with a radio access network using a selected radio access technology according to the multimode system selection scheme and the capability constraint; and
a fourth module for extending an interval between scans for service when the mobile device is determined to be in an out-of-service area, comprising modifying a portion of information saved for each of the plurality of multimode system selection schemes on the mobile device for disabling scanning at least one air interface type in an out-of-service condition of the mobile device.

28. A computer program product for provisioning mobile equipment or smart card for system selection of air-interface/access technologies, comprising:
a non-transitory computer-readable storage medium, comprising:
a first set of codes for causing a computer to select a multimode system selection scheme from a plurality of multimode system selection schemes each for selecting a radio access technology from a plurality of radio access technologies;
a second set of codes for causing the computer to determine a capability constraint of a mobile device for using the plurality of radio access technologies, comprising performing handshaking between a computing platform of the mobile device and an integrated circuit card containing a subscriber identifier to a mobile network to indicate each respective supported multimode system selection scheme;
a third set of codes for causing the computer to communicate with a radio access network using a selected radio access technology according to the multimode system selection scheme and the capability constraint; and
a fourth set of codes for extending an interval between scans for service when the mobile device is determined to be in an out-of-service area, comprising modifying a portion of information saved for each of the plurality of multimode system selection schemes on the mobile device for disabling scanning at least one air interface type in an out-of-service condition of the mobile device.

29. An apparatus for provisioning mobile equipment or smart card for system selection of air-interface/access technologies, comprising:
 means for selecting a multimode system selection scheme from a plurality of multimode system selection schemes each for selecting a radio access technology from a plurality of radio access technologies;
 means for determining a capability constraint of a mobile device for using the plurality of radio access technologies, comprising means for performing handshaking between a computing platform of the mobile device and an integrated circuit card containing a subscriber identifier to a mobile network to indicate each respective supported multimode system selection scheme;
 means for communicating with a radio access network using a selected radio access technology according to the multimode system selection scheme and the capability constraint; and
 means for extending an interval between scans for service when the mobile device is determined to be in an out-of-service area, comprising modifying a portion of information saved for each of the plurality of multimode system selection schemes on the mobile device for disabling scanning at least one air interface type in an out-of-service condition of the mobile device.

30. An apparatus for provisioning mobile equipment or smart card for system selection of air-interface/access technologies, comprising:
 a computing platform for selecting a multimode system selection scheme from a plurality of multimode system selection schemes each for selecting a radio access technology from a plurality of radio access technologies;
 a smart card interfaced to the computing platform for determining a capability constraint of a mobile device for using the plurality of radio access technologies, wherein the computing platform and the smart card that is an integrated circuit card containing a subscriber identifier to a mobile network are configured to perform handshaking to indicate each respective supported multimode system selection scheme; and
 a transceiver for communicating with a radio access network using a selected radio access technology according to the multimode system selection scheme and the capability constraint,
 wherein the computing platform is further for extending an interval between scans for service when the mobile device is determined to be in an out-of-service area, comprising modifying a portion of information saved for each of the plurality of multimode system selection schemes on the mobile device for disabling scanning at least one air interface type in an out-of-service condition of the mobile device.

31. The apparatus of claim 30, wherein the plurality of multimode system selection schemes comprise a 3GPP multimode system selection scheme, a 3GPP2 multimode system selection scheme, and a generalized preferred roaming list multimode system selection scheme.

32. The apparatus of claim 30, wherein the smart card interfaced to the computing platform is further for determining the capability constraint by determining provisioning of the subscriber identifier of the mobile device for a mobile operator.

33. The apparatus of claim 32, wherein the smart card interfaced to the computing platform is further for determining provisioning of the subscriber identifier by detecting one of a group consisting of a Removable User Identity Module (R UIM), Universal Integrated Circuit Card (UICC) with CDMA Subscriber Identity Module (CSIM), UICC with Universal Subscriber Identity Module (USIM) and CSIM, and Subscriber Identity Module (SIM).

34. The apparatus of claim 33, further comprising detecting a second one of the group, wherein the computing platform is further for determining provisioning of the second one of the group and for selectively activating the one and the second one of the group.

35. The apparatus of claim 30, wherein the smart card interfaced to the computing platform is further for determining the capability constraint by determining a transceiver limitation of the mobile device associated with an air interface.

36. The apparatus of claim 35, wherein the smart card interfaced to the computing platform is further for determining the transceiver limitation by communicating via a single mode or multimode.

37. The apparatus of claim 35, wherein the computing platform is further for storing the transceiver limitation on the smart card incorporated in the mobile device.

38. The apparatus of claim 35, wherein the smart card interfaced to the computing platform is further for determining the capability constraint by determining a transceiver limitation of the mobile device being roaming or at home.

39. The apparatus of claim 30, wherein the smart card interfaced to the computing platform is further for determining the capability constraint by determining a transceiver limitation of the mobile device for communicating on at least one of a group consisting of CDMA2000, 3GPP, 3GPP2, GSM, and WiMAX air interfaces.

40. The apparatus of claim 30, wherein the computing platform is further for accessing a first multimode system selection scheme stored on the computing platform and for accessing a second multimode system selection scheme stored on the smart card.

41. The apparatus of claim 30, wherein the computing platform is further for determining an available plurality of radio access technologies that satisfy the multimode system selection scheme and the capability constraint, and for selecting one of the available plurality of radio access technologies in accordance to a priority setting.

42. The apparatus of claim 30, wherein the computing platform is further for receiving a network command to enable or disable a specified radio access technology.

43. The apparatus of claim 30, wherein the computing platform is further for accessing the multimode system selection scheme by accessing an elementary file on the smart card that is provisioned with the mobile device.

44. The apparatus of claim 30, wherein the transceiver is further for receiving a command to modify a locally stored data structure for the multimode system selection scheme by an over-the-air service provisioning.

45. The apparatus of claim 30, wherein the computing platform is further for determining a geographic location of the mobile device, and for accessing the capability constraint that specifies whether the selected radio access technology is available in the geographic location.

46. The apparatus of claim 30, wherein the computing platform is further for determining a current calendar date, and for accessing the capability constraint that specifies whether the selected radio access technology is available on the current calendar date.

47. The apparatus of claim 30, wherein the computing platform is further for accessing the multimode system selection scheme in a generic service table contained in the smart card.

48. The apparatus of claim 30, wherein the computing platform is further for determining a geographic location of the mobile device, and for accessing the capability constraint that specifies whether a manual selection of a radio access technology is available in the geographic location.

49. The apparatus of claim 30, wherein the computing platform is further for accessing the multimode system selection scheme to determine an anchor system that serves as a primary selection.

50. The apparatus of claim 30, wherein the computing platform is further for accessing the multimode system selection scheme that associates with two air-interfaces.

51. The apparatus of claim 30, wherein the computing platform is further for extending the interval between scans for service further comprises determining that a threshold has been exceeded.

52. The apparatus of claim 30, wherein the computing platform is further for extending the interval between scans for service dependent upon a user preference for scanning in the out-of-service area.

53. The apparatus of claim 30, wherein the computing platform is further for extending the interval between scans for service dependent upon sensing a lack of user interaction with the mobile device.

54. The apparatus of claim 30, wherein the computing platform is further for extending the interval between scans for service dependent upon a location of the mobile device.

55. The apparatus of claim 54, wherein the transceiver and the computing platform are further for determining the location of the mobile device based upon a selected one of receiving a geographic positioning signal, detecting a wireless access transmission, matching radio frequency environment to a stored location description, and identifying a cellular pilot that indicates the out-of-service area.

* * * * *